US008524307B2

(12) United States Patent
Bytof et al.

(10) Patent No.: US 8,524,307 B2
(45) Date of Patent: Sep. 3, 2013

(54) HEALTHY COFFEE AND METHODS OF ITS PRODUCTION

(75) Inventors: Gerhard Bytof, Hamburg (DE); Ingo Lantz, Hamburg (DE); Herbert Stiebitz, Hamburg (DE); Doris Marko, Mauerbach (AT); Ute Böttler, Vienna (AT); Veronika Somoza, Werdling (AT); Christine Kotyczka, Olching (DE); Malte Rubach, München (DE); Gerhard Eisenbrand, Heidelberg (DE); Tamara Bakuradze, Kaiserslautern (DE); Thomas Hofmann, Neufahrn (DE); Roman Lang, Freising (DE); Anika Wahl, Lorch (DE); Rudolf Eggers, Buxtehude (DE)

(73) Assignee: TCHIBO GmbH, Hamburg (DE)

( * ) Notice: Subject to any disclaimer, the term of this patent is extended or adjusted under 35 U.S.C. 154(b) by 0 days.

(21) Appl. No.: 13/643,011

(22) PCT Filed: Apr. 27, 2011

(86) PCT No.: PCT/EP2011/002118
§ 371 (c)(1),
(2), (4) Date: Feb. 6, 2013

(87) PCT Pub. No.: WO2011/134656
PCT Pub. Date: Nov. 3, 2011

(65) Prior Publication Data
US 2013/0156928 A1    Jun. 20, 2013

(30) Foreign Application Priority Data
Apr. 30, 2010   (EP) .................................... 10004602

(51) Int. Cl.
*A23F 5/04* (2006.01)
(52) U.S. Cl.
USPC ............ 426/594; 426/433; 426/629; 426/466
(58) Field of Classification Search
USPC .................................. 426/594, 433, 629, 466
See application file for complete search history.

(56) References Cited

U.S. PATENT DOCUMENTS

| 3,700,462 | A | * | 10/1972 | Stefanucci et al. | ........... 426/466 |
| 4,349,573 | A | * | 9/1982 | Stefanucci et al. | ........... 426/388 |
| 2009/0011095 | A1 | * | 1/2009 | Yamane et al. | ................ 426/115 |

FOREIGN PATENT DOCUMENTS

| EP | 0755631 | * | 1/1997 |
| EP | 1808078 | * | 7/2007 |

(Continued)

OTHER PUBLICATIONS

Somoza et al. Activity-Guided Identification of a Chemopreventative Compound in Coffee Beverage using in Vitro and in Vivo Techniques. Journal of Agr. and Food Chem. vol. 51, No. 23. 2003. pp. 6861-6869.*

(Continued)

*Primary Examiner* — Anthony Weier
(74) *Attorney, Agent, or Firm* — Pergament Gilman & Cepeda LLP; Milagros A. Cepeda; Edward D. Pergament

(57) ABSTRACT

The present invention relates to a method for producing a coffee blend and the coffee blend obtained by this method, wherein the coffee blend is characterized in that a coffee drink brewed from said coffee blend contains high amounts of chlorogenic acids (CGA) and N-methylpyridinium cations (NMP) and optionally, low amounts of carboxylic acid-5-hydroxytryptamides (C5-HT), has a superior antioxidative activity.

13 Claims, 27 Drawing Sheets

(56) References Cited

FOREIGN PATENT DOCUMENTS

Figure 1:
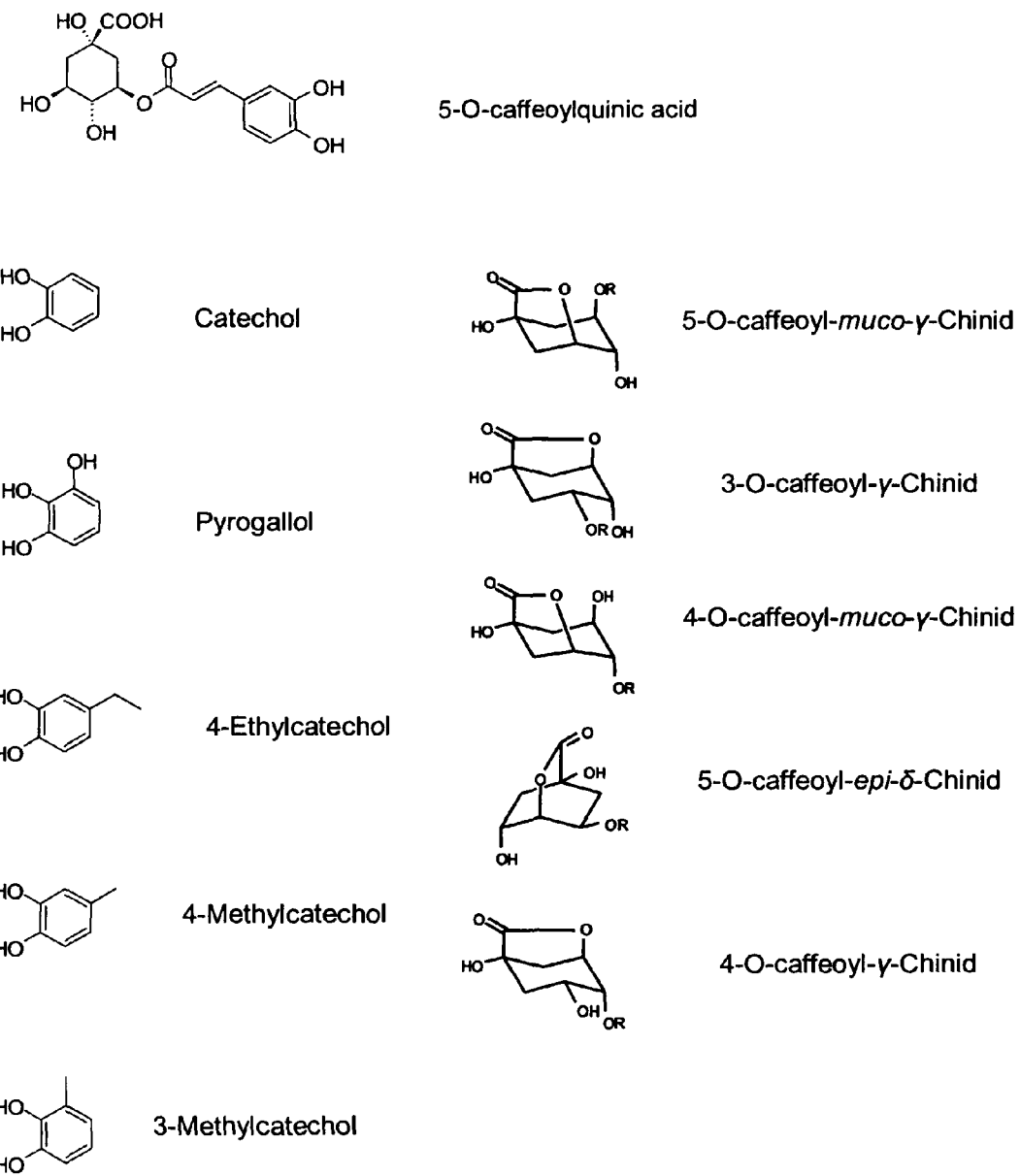

| WO | WO 87/04598 | * | 8/1987 |
| WO | WO 01/67880 | * | 9/2001 |

OTHER PUBLICATIONS

Van Der Stegen. The Effect of Dewaxing of Green Coffee on the Coffee Brew. Food Chemistry. vol. 4, No. 1. Jan. 1979. pp. 23-29.*

* cited by examiner

Caffeine

Trigonelline

Nicotinic acid

Nicotinamide

Methylnicotinate

N-methyl-3-picolinium

N-methylpyridinium

N-methyl-2-picolinium

N-methyl-4-picolinium convection heat
(short time roasting)

HEALTHY COFFEE AND METHODS OF ITS PRODUCTION

This application is a National Stage Application under U.S.C. §371 of PCT International Application No. PCT/EP2011/002118 filed Apr. 27, 2011, which claims priority to European Application EP10004602, filed on Apr. 30, 2010; both of which are hereby incorporated herein by reference in their entirety.

The present invention relates to a method for producing a coffee blend and the coffee blend obtained by this method, wherein the coffee blend is characterized in that a coffee drink brewed from said coffee blend contains high amounts of chlorogenic acids (CGA) and N-methylpyridinium cations (NMP) and optionally, low amounts of carboxylic acid-5-hydroxytryptamides (C5-HT) and has a superior antioxidative activity.

Coffee is one of the most popular beverages. Common modes of consumption comprise the use in soluble form, wherein dried coffee extracts are dissolved in hot water, and the use of roasted and ground coffee (roasted coffee). Various methods of brewing roasted coffee are usually employed, for example:
- infusing in a vessel with hot water at atmospheric pressure, stirring and sedimentation of the coffee particles;
- infusing with cold water and letting it boil at atmospheric pressure while filtering the beverage before or after boiling;
- direct infusion in a coffee machine at atmospheric pressure using a filter (filter coffee more or less free of crema)
- direct brewing in a coffee machine at high pressure using a pump pressure of up to 20 bar (coffee with crema, espresso).

Accordingly, there are essentially two preparation techniques for coffee:
- coffee beverage obtained at atmospheric pressure (filter coffee)
- coffee beverage obtained at high pressure (coffee with crema).

Due to the different preparation techniques, the characteristic features of the starting coffees are also different and are optimized for the particular brewing method:
- filter coffee is roasted relatively light and fast (about 1.5 to about 5 minutes)
- coffee with crema/espresso is roasted relatively dark and slowly (about 8 to about 20 minutes).

While filter coffee has a mild and aromatic taste profile without any prominent bitter or burned flavors, coffee with crema/espresso is characterised by a distinct roasty, strong and sometimes bitter taste profile.

When changing the brewing pressure, different groups of substances are released from the starting coffee in a varying degree, which results in an altered sensorial taste profile. Accordingly, a coffee which is roasted relatively light and fast, would become distinctly sourer in the resulting beverage when brewed in a machine at high pressure. Contrary, a coffee which is roasted relatively dark and slowly being obtained using a brewing method at atmospheric pressure results in an unwanted sensorial taste profile towards smoky, bitter, burned.

As a consequence, the starting coffees are adjusted to the desired sensorial features according to the respective brewing method for coffee manufacturers' purposes. Therefore, it is not obvious for a coffee manufacturer in view of the expectations of the consumers to produce a mixture of coffee which is roasted relatively light and fast, and coffee which is roasted relatively dark and slowly.

Chlorogenic acids (CGA) are important mediators of the antioxidative activity of green and roasted coffee beans. However, during roasting of green coffee beans, CGA are increasingly degraded, and important new components are generated that not only influence the antioxidative activity of the resulting coffee drink but also its sensory characteristics. In particular, CGA are extensively degraded by pyrolysis during roasting, whereby bitter tasting lactone derivatives, CGA substructures like caffeic acid and quinic acid, as well as low-molecular hydroxybenzenes are generated.

In general, when roasting coffee beans, a linear relationship can be seen between the concentrations of CGA and the roast degree, wherein a darker roasting correlates with a lower concentration of CGA.

Trigonelline which is the second important alkaloid in green coffee after caffeine, is also strongly degraded during roasting. The resulting degradation products include, among others, substances that can be important for the aroma of the resulting coffee drink, the above NMP as well as the N-methylpicolinium cation, and the pyridine derivatives nicotinamide and nicotinic acid. NMP is particularly interesting concerning beneficial health-related effects, since it can upregulate the expression of phase II detoxifying enzymes which protect cells from oxidative stress. The darker the coffee beans are roasted, the more NMP is generated, i.e. there is a close relationship between the roasting degree and the NMP content of roasted coffee beans. Another important degradation product of trigonelline is nicotinic acid, also known as vitamin B3, which is converted to nicotinamide in the body and which is of outstanding importance as part of the coenzymes nicotinamide-adenine dinucleotide ($NAD^+$) and nicotinamide-adenine dinucleotide phosphate ($NADP^+$).

In general, when roasting coffee beans a linear relationship can be seen between the concentrations of NMP and the roast degree, wherein a darker roasting correlates with a high concentration of NMP.

While coffee beans of *Coffea arabica* have about 0.79 to 1.05% trigonelline in dry mass, beans of *Coffea robusta* have about 0.32 to 0.68% trigonelline in dry mass, and beans of *Coffea arabusta*, which is a hybrid of *Coffea arabica* and *Coffea robusta*, have about 0.58% trigonelline in dry mass (Stennart and Maier, Zeitschrift für Lebensmitteluntersuchung und Forschung 196:430-434, 1993). *Arabica* and *Robusta* are chemically quite different from each other. Chemical component analysis is a suitable tool for distinguishing between products of the two species (Martin, M. J., F. Pablos, and G. A. Gustavo, *Discrimination between arabica and robusta green coffee varieties according to their chemical composition*. Talanta, 1998. 46(6): p. 1259-1264). Not only trigonelline levels are lower in *Robusta* (see above) also caffeine levels are significantly higher (Maier, H. G., Kaffee. Grundlagen und Fortschritte der Lebensmitteluntersuchung und Lebensmitteltechnologie. Vol. 18. 1981, Berlin Hamburg: Paul Parey. 199).

The surface of green coffee beans is covered by a layer of so-called coffee wax. Coffee wax is a complex mixture of fat-like substances that are soluble in organic solvents. Up to 0.3% by weight of the coffee bean is coffee wax. The main components of coffee wax are C5-HT which are the main cause for stomach irritation caused by coffee consumption in sensitive persons. The content of C5-HT in untreated green coffee beans is variable, wherein beans from *Coffea arabica* contain about twice as much C5-HT as beans from *Coffea canephora*. C5-HT are degraded during roasting to about 50% of the content in green coffee beans. Methods to decrease the C5-HT content in roasted coffee beans more significantly include steam-treatment and/or dewaxing green coffee beans prior to roasting, whereas steam treatment reduces C5-HT by about 10 to 25%. Further, decaffeinating green coffee beans is effective for reducing the C5-HT content. Recently, C5-HT in coffee could clearly be linked to the stimulation of gastric acid secretion. Therefore, reduction of C5-HT in coffee beans can reduce coffee-specific gastric acid secretion and reduce resulting stomach irritation in sensitive persons.

Accordingly, high amounts of CGA provide a high antioxidative activity, high amounts of NMP provide upregulation of the expression of phase II detoxifying enzymes, and low amounts of C5-HT prevent disproportionate gastric acid secretion. However, since CGA are degraded during roasting, high amounts of CGA in roasted coffee beans can only be obtained by only lightly roasting green coffee beans at the expense of only low amounts of NMP and relatively high amounts of C5-HT in said roasted coffee beans. Vice versa, high amounts of NMP and low amounts of C5-HT in roasted coffee beans can only be obtained by strongly roasting green coffee beans at the expense of low amounts of CGA.

EP 1 808 078 A1 describes modified coffee having a relatively reduced amount of caffeine and containing 3 mg or more of a nicotinic acid compound and 10 mg or more of a Maillard reaction product per 10 g of roasted coffee beans. While this formula A on page 4 of EP 1 808 078 A1 applies to nicotinic acid (niacin) and nicotinamide, it does not apply on N-methylpyridinium. Moreover, the above mentioned patent application fails to disclose the roasting of the coffee beans used. No information regarding the roasting degree or the roasting colour can be found in said document. Additionally, EP 1 808 078 A1 does not teach the amount of raw coffee used as starting material in a particular roasting process, and therefore does not enable a person skilled in the art to extrapolate the resulting roasting degree or roasting colour which depends on the amount of raw coffee used per roasting process.

Moreover, WO 87/04598 discloses the addition of CGA to the end product after roasting coffee beans. This is in accordance with a strong prejudice in the prior art not to add CGA to coffee beans before roasting the coffee beans, since roasting causes a thermal degradation of CGA (Trugo, L. C. and R. Macrae, *A study of the effect of roasting on the chlorogenic acid composition of coffee using HPLC*. Food Chemistry, 1984. 15: p. 219-227; Clifford, M. N. *Chlorogenic acids— Their characterisation, transformation during roasting, and potential dietary significance*. in 21$^{ème}$ Colloque Scientifique International sur le Café. 2007. Montpellier, France, 11-15 Sep. 2006: ASIC, Paris: p. 36-49).

Therefore, the technical problem underlying the present invention is to provide a method for producing a coffee blend that is characterized in that it itself, as well as a coffee drink that is brewed from said coffee blend, has high antioxidative activity, induces an upregulation of the expression of phase II detoxifying enzymes, and optionally prevents disproportionate gastric acid secretion, wherein said coffee drink at the same time should be characterized by advantageous sensorial properties.

The solution to the above technical problem is achieved by the embodiments characterized in the claims.

In particular, the present invention relates to a method for producing a coffee blend, wherein the coffee blend is characterized in that a coffee drink brewed from said coffee blend under standard conditions contains at least 65 mg/L N-methylpyridinium cations (NMP) and at least 550 mg/L chlorogenic acids (CGA), comprising the steps of (a) providing coffee beans of *Coffea arabica* that have been drum roasted for at least 10 minutes at 190° C. to 210° C. to a dark degree of about 45 to 60 scale parts;

(b) providing coffee beans of *Coffea arabica* that have been roasted by rotary fluidized bed (RFB) roasting for at most 5 minutes at 240° C. to 270° C. to a medium degree of about 75 to about 90 scale parts;

(c) blending at least two components, wherein one blend component consists of coffee beans according to (a) and one blend component consists of coffee beans according to (b), and wherein the coffee beans according to (a) form 60 to 80% (w/w) of the blend and the coffee beans according to (b) form 20 to 40% (w/w) of the blend.

In a more preferred embodiment of the present invention, in step (c) at least one blend component consists of coffee beans according to (a) and wherein at least one blend component consists of coffee beans according to (b), and wherein the coffee beans according to (a) form 65 to 80% w/w, more preferably 70 to 80% w/w, more preferably 75 to 80% w/w, more preferably 60 to 75% w/w, more preferably 60 to 70% w/w, more preferably 60 to 65% w/w, more preferably 65 to 75% w/w, more preferably 65 to 70% w/w, more preferably 70 to 75% w/w, of the blend and the coffee beans according to (b) form 20 to 40% w/w, more preferably 20 to 35% w/w, more preferably 20 to 30% w/w, more preferably 20 to 25% w/w, more preferably 25 to 40% w/w, more preferably 25 to 35% w/w, more preferably 25 to 30% w/w, more preferably 30 to 40% w/w, more preferably 30 to 35% w/w, more preferably 30 to 40% w/w, more preferably 35 to 40% w/w, of the blend.

In a preferred embodiment of the method of the present invention, the method further comprises the step of spiking green coffee beans of at least one blend component with at least one compound, selected from the group consisting of CGA and trigonelline, prior to roasting.

The spiking components can also be added during roasting, for instance in the Torrefacto process (Torrefacto-roasting, also called "spanische Röstung"), where liquid sugar and spiking component are added at the end of the roasting process.

In another aspect, the present invention relates to a coffee blend, characterized in that a coffee drink brewed from said coffee blend under standard conditions contains at least 65 mg/L N-methylpyridinium cations (NMP) and at least 550 mg/L chlorogenic acids (CGA), obtainable by a method for producing a coffee blend, comprising the steps of (a) providing coffee beans of *Coffea arabica* that have been drum roasted for at least 10 minutes at 190° C. to 210° C. to a dark degree of about 45 to 60 scale parts;

(b) providing coffee beans of *Coffea arabica* that have been roasted by rotary fluidized bed (RFB) roasting for at most 5 minutes at 240° C. to 270° C. to a medium degree of about 75 to about 90 scale parts;

(c) blending at least two components, wherein at least one blend component consists of coffee beans according to (a) and wherein at least one blend component consists of coffee beans according to (b), and wherein the coffee beans according to (a) form 60 to 80% (w/w) of the blend and the coffee beans according to (b) form 20 to 40% (w/w) of the blend, preferably further comprising the step of spiking green coffee beans of at least one blend component with at least one compound, selected from the group consisting of CGA and trigonelline, prior to roasting.

The term "coffee" as used herein means ground coffee powder or coffee beans. Accordingly, the coffee blend according to the present invention is a coffee powder blend or a blend of coffee beans, where origins of the coffees can be the same or different.

In one embodiment of the method and the coffee blend of the present invention, the blend components in step (c) contain coffee beans and the coffee blend according to the present invention is a blend of coffee beans. In a preferred embodiment of the present invention, the coffee beans are ground prior to brewing the coffee drink, preferably to a grading selected from the group consisting of fine, medium, and crude, if the coffee blend according to the present invention is a blend of coffee beans. Methods for grinding coffee beans are well known in the art.

In another embodiment of the method and the coffee blend of the present invention, the blend components in step (c) contain coffee powder and the coffee blend according to the present invention is a coffee powder blend. In a preferred embodiment of the method of the present invention, the coffee beans provided in steps (a) and (b) have been ground before step (c), if the coffee blend according to the present invention is a coffee powder blend.

Standard conditions for brewing a coffee drink from a coffee blend are known to a person skilled in the art. In a preferred embodiment, the standard conditions for brewing a coffee drink from a coffee blend are selected from the group consisting of
infusing a coffee blend in a vessel containing with hot water at atmospheric pressure, stirring and sedimentation of the coffee particles;
infusing a coffee blend with cold water and letting it boil at atmospheric pressure while filtering the beverage before or after the boiling;
direct infusion of a coffee blend in a coffee machine at atmospheric pressure using a filter (froth-less filter coffee); and
direct brewing of a coffee blend in a coffee machine at high pressure using a pump pressure of up to 20 bar (coffee with crema, espresso).

In a more preferred embodiment, the standard conditions are as follows: about 29.5 g coffee blend are brewed in a coffee machine (typically a standard drip-filter Filter-coffee machine brewing under atmospheric pressure) with a size 4 coffee filter using about 600 ml tap water. If whole beans are concerned, those having a fineness of grinding of about 420 μm (medium particle size taken at a volumetric content of 63.2% measured by Helos laser diffraction analyzer) are used under said standard conditions.

In another preferred embodiment, the brewing of a coffee drink from a coffee blend is carried out using a pad comprising the ground coffee blend according to the present invention encased in a pad formed by filter cloth. Methods and apparatuses for brewing coffee from coffee powder pads are well known in the prior art. For example, in this embodiment the standard conditions for brewing are as follows: about 7 to 8 g coffee blend in a coffee powder pad are brewed in a coffee machine suitable for brewing coffee using coffee powder pads with tap water yielding in about 125 ml coffee drink.

In another preferred embodiment, the brewing of a coffee drink from a coffee blend is carried out using a capsule comprising the ground coffee blend according to the present invention encased in a solid capsule, preferably a plastic capsule. Methods and apparatuses for brewing coffee from coffee powder capsules are well known in the prior art. For example, in this embodiment the standard conditions for brewing are as follows: about 7 to 8 g coffee blend in a coffee powder capsule are brewed in a coffee machine suitable for brewing coffee using solid coffee powder capsules with tap water yielding in about 40 to 125 ml coffee drink.

The terms "N-methylpyridinium" and "NMP" as used herein relate not only to N-methylpyridinium in its ionic form, but also to N-methylpyridinium in salt-form, for example as N-methylpyridinium iodide, N-methylpyridinium chloride, N-methylpyridinium hydroxide or N-methylpyridinium sulfate.

The terms "chlorogenic acids" and "CGA" as used herein relate to all chlorogenic acids that can be found in coffee beans and comprises the caffeoylquinic acid isoforms neo-, n-, and krypto-chlorogenic acid, as well as the dicaffeoylquinic acid isoforms iso-1-, iso-2-, and iso-3-chlorogenic acid.

In a preferred embodiment of the method and the coffee blend of the present invention, the coffee drink brewed from said coffee blend has a ratio between the concentration of CGA to the concentration of NMP of between 6 and 12, more preferably between 7 and 10, most preferably between 7.5 and 9, in the coffee drink.

In a preferred embodiment of the method and the coffee blend of the present invention, the coffee drink brewed from said coffee blend contains at least 65 mg/L NMP, more preferably at least 70 mg/L NMP, more preferably at least 75 mg/L NMP, more preferably at least 80 mg/L NMP, more preferably at least 85 mg/L NMP, more preferably at least 90 mg/L NMP, more preferably at least 90 mg/L NMP and at least 550 mg/L CGA, more preferably at least 600 mg/L CGA, more preferably at least 650 mg/L CGA, more preferably at least 700 mg/L CGA, more preferably at least 750 mg/L CGA, more preferably at least 800 mg/L CGA, more preferably at least 850 mg/L CGA. Any combination of any of the herein defined values for NMP with any of the herein defined values for CGA is within the preferred embodiments of the present invention.

The terms "carboxylic acid-5-hydroxytryptamides" and "C5-HT" as used herein relate to all carboxylic acid-5-hydroxytryptamides that can be found in coffee beans and comprises $^\beta N$—$C_{18:0}$- to $^\beta N$—$C_{24:0}$-alkanoyl-5-hydroxytryptamides such as stearoyl-5-hydroxytryptamid, arachinoyl-5-hydroxytryptamide, behenoyl-5-hydroxytryptamide, and lignoceroyl-5-hydroxytryptamide. In a preferred embodiment, the C5-HT are $^\beta N$-alkanoyl-5-hydroxytryptamides.

In a preferred embodiment of the method and the coffee blend of the present invention, the coffee drink brewed from said coffee blend under standard conditions contains at most 200 mg/L C5-HT, more preferably 150 mg/L C5-HT, more preferably 100 mg/L C5-HT, more preferably at most 80 mg/L, more preferably at most 60 mg/L, and most preferably at most 40 mg/L C5-HT.

These characteristics, i.e. the specific concentrations and/or ratios of NMP, CGA, and C5-HT, are directly responsible for the advantageous physiologic properties of the coffee blend of the present invention, i.e. for its high antioxidative activity and mildness for the stomach.

According to a preferred embodiment of the method and the coffee blend of the present invention, the green coffee beans of at least one blend component are dewaxed and/or decaffeinated prior to roasting. Methods for dewaxing green coffee beans are well known in the art. For example, dewaxing can be carried out by the methods described by van der Stegen (van der Stegen, G. H. D., *The effect of dewaxing of green coffee on the coffee brew*, Food Chemistry 4(1), pp. 23-29, January 1979). Further, methods for decaffeinating green coffee beans are well known in the art, e.g. by treating the coffee beans with ethyl acetate, dichloromethane (DCM), or supercritical $CO_2$.

In another preferred embodiment of the method and the coffee blend of the present invention, the green coffee beans of at least one blend component are steam-treated prior to roasting. Methods for steam-treating green coffee beans are well known in the art.

In a preferred embodiment of the method and the coffee blend of the present invention, spiking is performed by infiltration in vacuum or impregnation under standard atmospheric pressure or via lyophilization with subsequent drying in a mechanical dryer back to the initial green coffee moisture content.

In a preferred embodiment of the method and the coffee blend of the present invention, green coffee beans of at least one blend component are spiked with CGA or CGA-containing extract, so that the final amount of CGA in the spiked green coffee beans is between 10% (w/w) to 300% (w/w) higher than the amount of CGA in the green coffee beans before spiking. In another preferred embodiment of the method and the coffee blend of the present invention, green coffee beans of at least one blend component are spiked with CGA, so that the final amount of CGA in the spiked green coffee beans is at least 10% (w/w), more preferably at least 20% (w/w), more preferably at least 30% (w/w), more preferably at least 50% (w/w), more preferably at least 100% (w/w), more preferably at least 150% (w/w), more preferably at least 200% (w/w) and most preferably at least 250% (w/w) higher than the amount of CGA in the green coffee beans before spiking. In a more preferred embodiment of the method and the coffee blend of the present invention, green coffee beans of at least one blend component are spiked with CGA, so that the final amount of CGA in the spiked green coffee beans is at most 300% (w/w) higher than the amount of CGA in the green coffee beans before spiking.

In a preferred embodiment of the method and the coffee blend of the present invention, green coffee beans of at least one blend component are spiked with trigonelline or trigonelline-containing extract, so that the final amount of trigonelline in the spiked green coffee beans is between 10% (w/w) to 300% (w/w) higher than the amount of trigonelline in the green coffee beans before spiking. In another preferred embodiment of the method and the coffee blend of the present invention, green coffee beans of at least one blend component are spiked with trigonelline, so that the final amount of trigonelline in the spiked green coffee beans is at least 10% (w/w), more preferably at least 20% (w/w), more preferably at least 30% (w/w), more preferably at least 50% (w/w), more preferably at least 100% (w/w), more preferably at least 150% (w/w), more preferably at least 200% (w/w) and most preferably at least 250% (w/w) higher than the amount of trigonelline in the green coffee beans before spiking. In a more preferred embodiment of the method and the coffee blend of the present invention, green coffee beans of at least one blend component are spiked with trigonelline, so that the final amount of trigonelline in the spiked green coffee beans is at most 300% (w/w) higher than the amount of trigonelline in the green coffee beans before spiking.

Both spiking methods, i.e. spiking with CGA or CGA-containing extract and trigonelline or trigonelline-containing extract, can also be combined.

In a preferred embodiment of the method and the coffee blend of the present invention, the coffee blend contains coffee that has been roasted to a dark degree and coffee that has been roasted to a medium degree in a ratio of 60:40 (dark:medium) to 80:20 (dark:medium). In a more preferred embodiment of the method and the coffee blend of the present invention, the coffee blend contains coffee that has been roasted to a dark degree and coffee that has been roasted to a medium degree in a ratio of 60:40 (dark:medium), 65:35 (dark:medium), 70:30 (dark:medium), 75:25 (dark:medium), or 80:20 (dark:medium).

In another preferred embodiment of the method and the coffee blend of the present invention, the coffee blend contains between 40% (w/w) and 20% (w/w), more preferred between 35% (w/w) and 20% (w/w), more preferred between 30% (w/w) and 20% (w/w), and most preferred between 25% (w/w) and 20% (w/w) coffee that have been roasted to a medium degree. In a further preferred embodiment of the method and the coffee blend of the present invention, the coffee blend contains 40% (w/w), 35% (w/w), 30% (w/w), 25% (w/w), or 20% (w/w) coffee that have been roasted to a medium degree.

In another preferred embodiment of the method and the coffee blend of the present invention, the coffee blend contains between 80% (w/w) and 60% (w/w), more preferred between 80% (w/w) and 65% (w/w), more preferred between 75% (w/w) and 65% (w/w), and most preferred between 70% (w/w) and 65% (w/w) coffee that have been roasted to a dark degree. In a further preferred embodiment of the method and the coffee blend of the present invention, the coffee blend contains 80% (w/w), 75% (w/w), 70% (w/w), 65% (w/w), or 60% (w/w) coffee that have been roasted to a dark degree.

In a particularly preferred embodiment of the present invention, the coffee blend comprises the following:
about 30% (w/w) coffee beans of *Coffea arabica* that have been roasted by rotary fluidized bed (RFB) roasting for about 3 minutes at about 260° C. to a roast degree of about 80 scale parts; and
about 70% (w/w) coffee beans of *Coffea arabica* that have been drum roasted for about 20 minutes at about 200° C. to a roast degree of about 50 scale parts.

In a more preferred embodiment of the present invention, the coffee blend consists of the following:
about 30% (w/w) dewaxed coffee beans of *Coffea arabica* that have been roasted by rotary fluidized bed (RFB) roasting for about 3 minutes at about 260° C. to a roast degree of about 80 scale parts; and
about 70% (w/w) dewaxed coffee beans of *Coffea arabica* that have been drum roasted for about 20 minutes at about 200° C. to a roast degree of about 50 scale parts.

Preferred embodiments of the method and the coffee blend of the present invention comprise a blend of non-spiked, trigonelline spiked, and/or CGA spiked coffee beans that have been roasted to a dark degree with non-spiked, trigonelline spiked, and/or CGA spiked coffee beans that have been roasted to a medium degree in any of the herein defined ratios or total amounts of the respective coffee beans in the coffee blend and in any of the herein defined amounts for the spiking of coffee beans with CGA and/or trigonelline, as well the respective blends obtained when blending coffee powder instead of coffee beans. For example, preferred embodiments of the method and the coffee blend of the present invention comprise the blend of non-spiked coffee beans that have been roasted to a dark degree with non-spiked coffee beans that have been roasted to a medium degree, trigonelline spiked and/or CGA spiked coffee beans that have been roasted to a dark degree with non-spiked coffee beans that have been roasted to a medium degree, non-spiked coffee beans that have been roasted to a dark degree with trigonelline spiked and/or CGA spiked coffee beans that have been roasted to a medium degree, trigonelline spiked and/or CGA spiked coffee beans that have been roasted to a dark degree with trigonelline spiked and/or CGA spiked coffee beans that have been roasted to a medium degree, in any of the herein defined ratios or total amounts of the respective coffee beans in the coffee blend and in any of the herein defined amounts for the spiking of coffee beans with CGA and/or trigonelline, as well the respective blends obtained when blending coffee powder instead of coffee beans.

Regarding the color, a roast degree of less than 60 scale parts, for example less than 50 scale parts, or less than 45 scale parts, is considered to be dark. A roast degree of about 75 to about 90 scale parts, for example about 80 to about 90 scale parts, about 85 to about 90 scale parts, or about 75 to about 80 scale parts is considered to be medium. A roast degree of at least 90 scale parts is considered to be light. The roast degree can be easily determined by a person skilled in the art, for example by using the color detection devices Dr. Lange—LFM 1, Dr. Lange—LK 100, or RSM 2 produced by Schaltex GmbH, according to the respective protocols provided by the manufacturers.

In a preferred embodiment of the present application, the coffee beans that have been roasted to a medium degree are roasted using fluidized bed roasting for 1.5 to 5 minutes, for 1.5 to 4 minutes, or for 1.5 to 3 minutes. In another preferred embodiment of the present application, the coffee beans that have been roasted to a dark degree are roasted using drum roasting for 8 to 25 minutes, for 10 to 25 minutes, for 15 to 25 minutes, for 8 to 20 minutes, for 10 to 20 minutes, or for 15 to 20 minutes.

Figure 22:
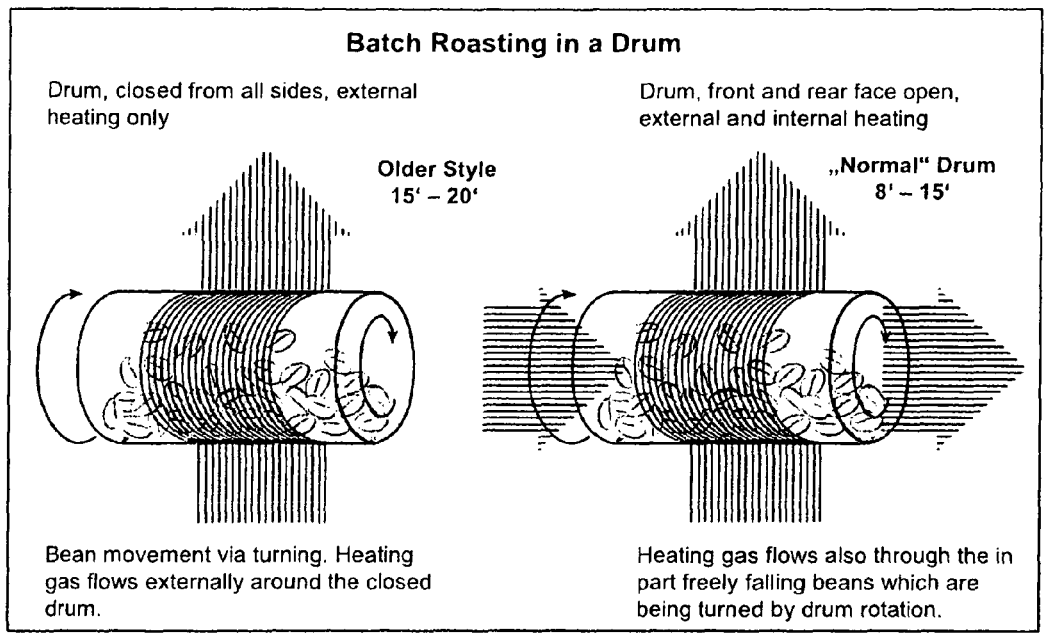
Figure 23:
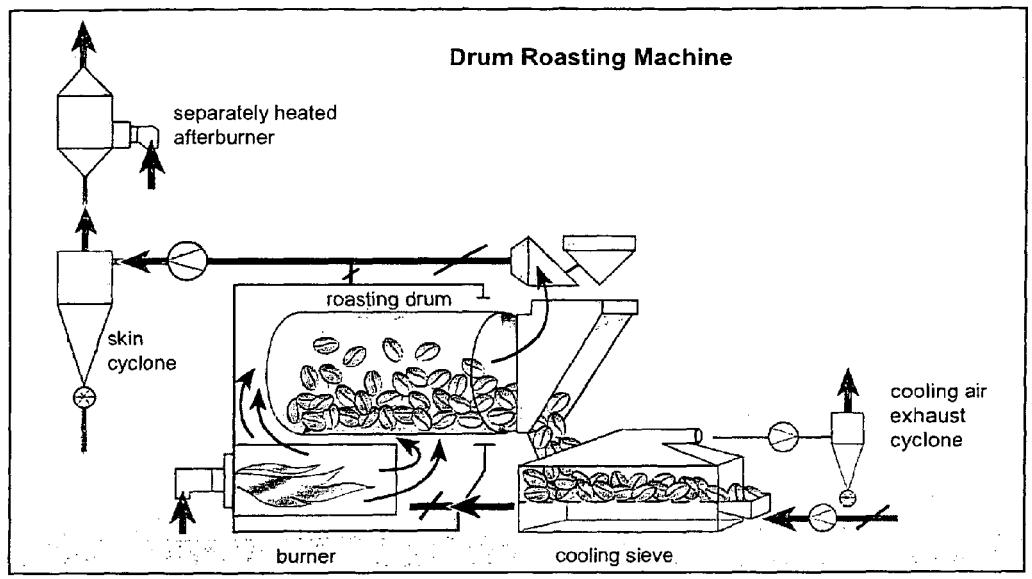

Examples for batch roasting in a drum for carrying out drum roasting can be found in FIG. 22, and an example for a drum roasting machine which can be used for the drum roasting can be found in FIG. 23.

Figure 24:
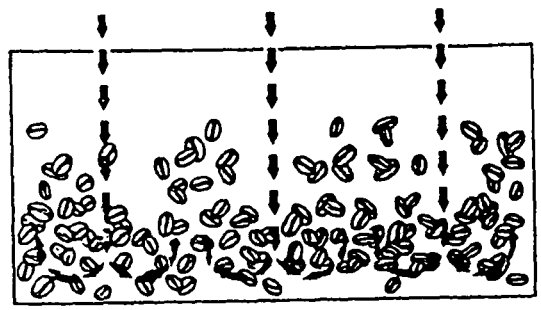
Figure 24:
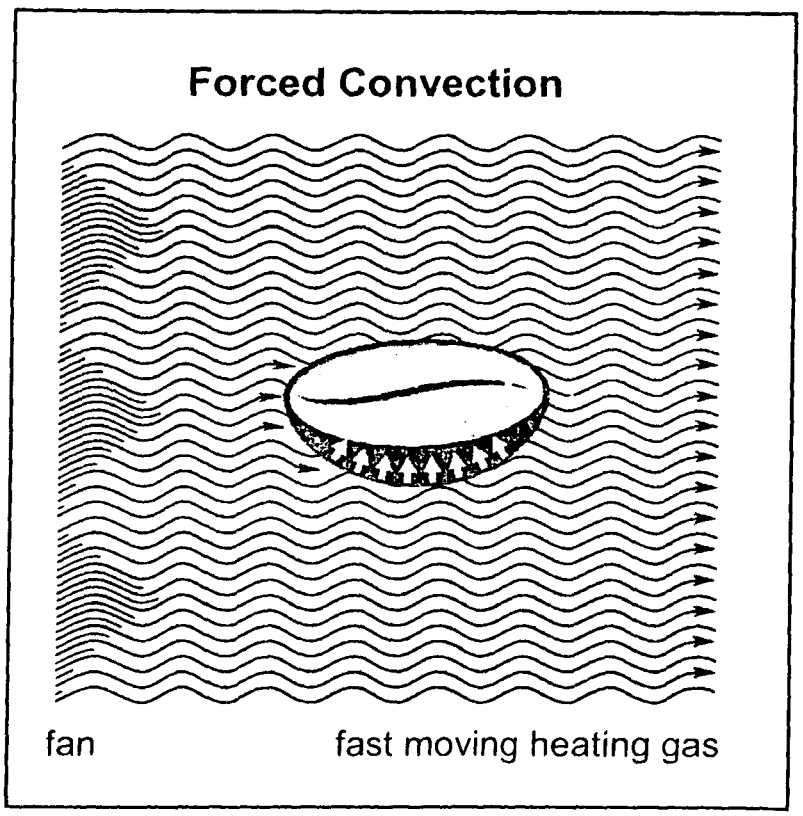
Figure 25:
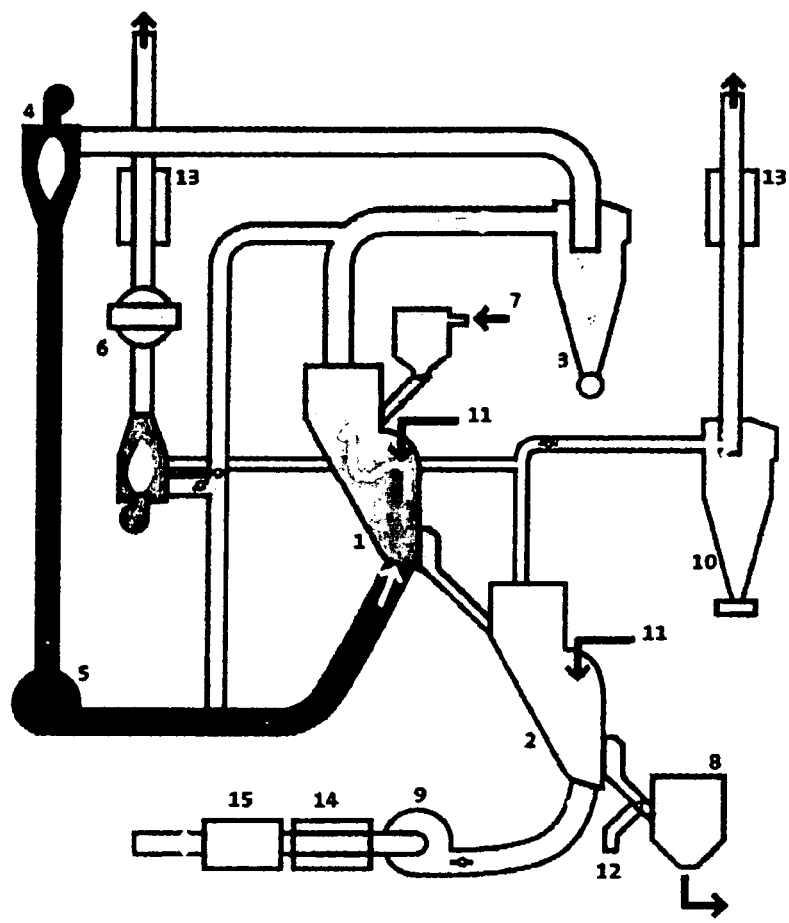

Examples for a fluidized bed roaster drum for carrying out fluidized bed roasting can be found in FIG. 24, and an example of a rotary fluidized bed roaster can be found in FIG. 25.

In a further preferred embodiment of the method and the coffee blend of the present invention, a coffee drink that is brewed from said coffee blend has an antioxidative activity and/or is stomach-friendly.

The coffee beans that can be used for the coffee blend and method of the present invention are not limited as long as the coffee beans aree from *Coffea arabica*, for example *Coffea arabica* provenience Columbia or Brazil.

In a preferred embodiment, the present invention advantageously provides a method of producing a coffee blend, wherein CGA and/or trigonelline are added to the coffee beans before roasting of the coffee beans despite the prejudice in the prior art. The method for obtaining the blend according to the present invention provides in a preferred embodiment an end product which has more CGA and/or trigonelline than the end products of conventional coffee roasting process, despite the thermal degradation of said components during roasting as shown for example in FIGS. 20 and 21.

Surprisingly, the thermal modification during the roasting process of CGA added to the coffee beans before roasting in a preferred embodiment of the method according to the present invention results in sensory advantages of the coffee brewed from said beans. In particular, chlorogenic acid is a precursor of aroma impact compounds which are perceived as being pleasant by consumers. Besides these volatile flavour components also non-volatile bitter agents which are characterising the flavour of the product are produced during the roasting of CGA. Pure chlorogenic acid is sour, bitter and astringent. Additionally, chlorogenic acid and its degradation products are important components of the essential melanoid fraction which determines the colour and the anti-oxidative capacity of the coffee product. Therefore, by adding CGA and/or trigonelline in a preferred embodiment of the present invention before the roasting of the coffee beans, the present application provides a coffee blend which contains additional valuable coffee components and reduces unwanted tastes like sour, bitter and astringent to a minimum. The sensory analysis of a coffee drink brewed from the blend according to the present invention did not show any undesirable aromas.

The Figures show:

FIG. 1: Structures of 5-O-caffeoylquinic acid and related degradation products.

Figure 2:
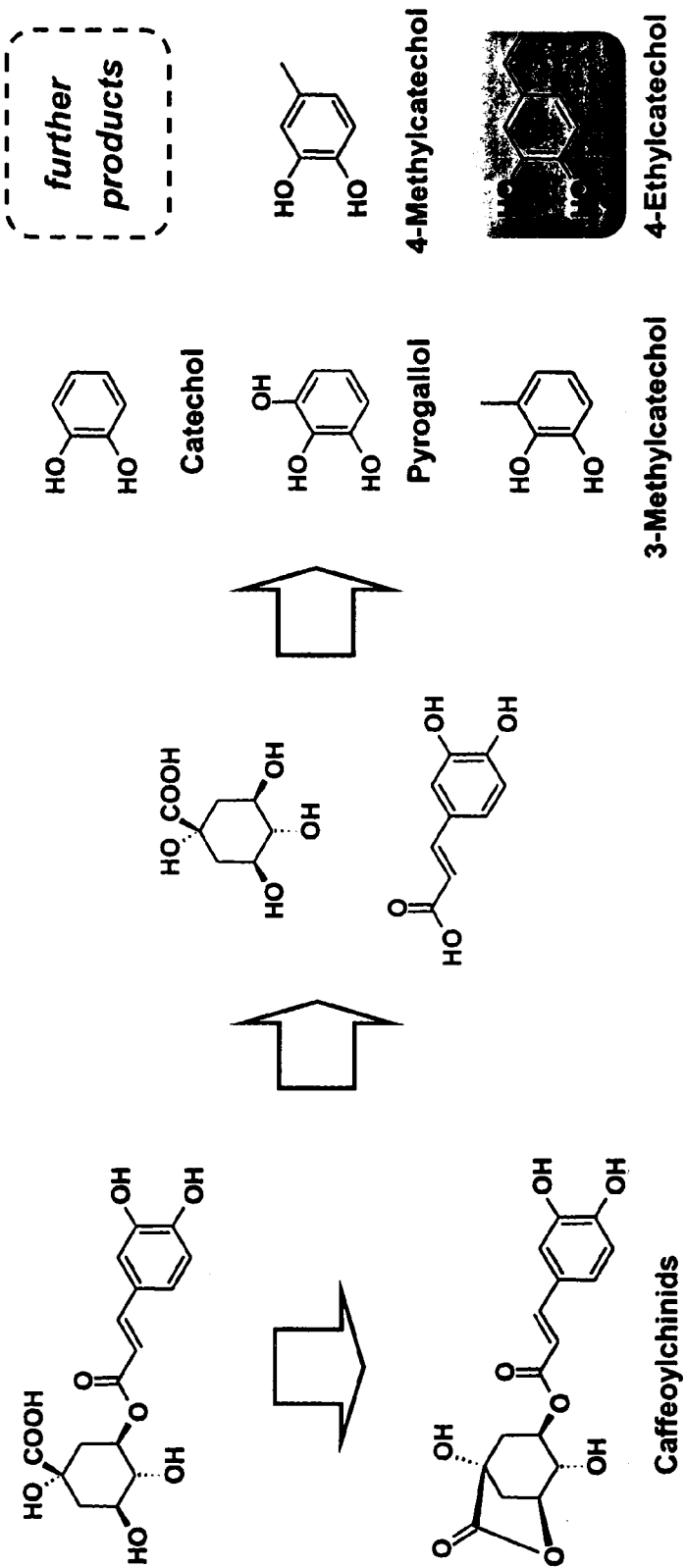

FIG. 2: Schematic overview of the degradation of 5-O-caffeoylquinic acid during roasting of green coffee beans.

Figure 3:
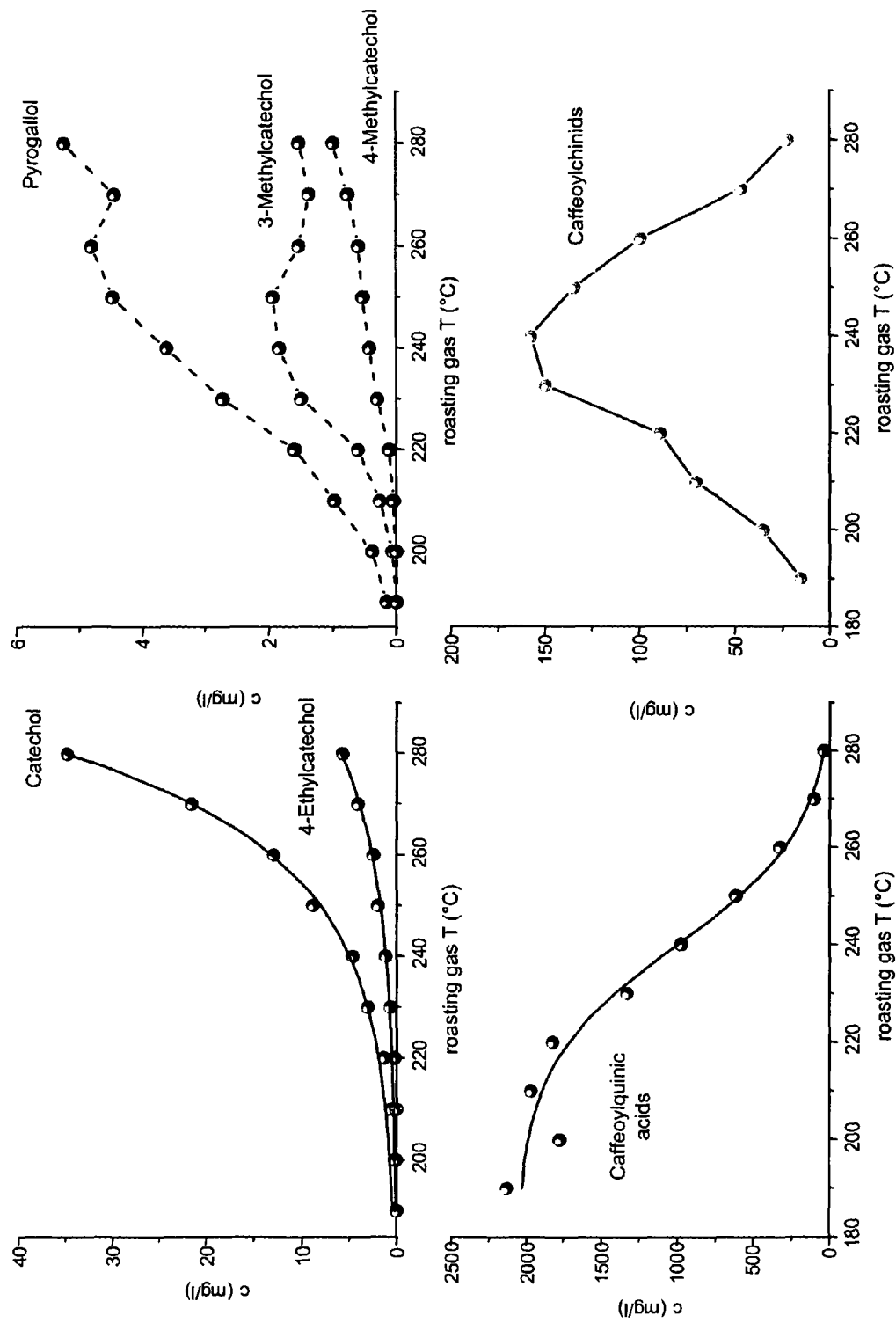

FIG. 3: Quantitative analysis of caffeoylquinic acids, caffeoylchinids, catechol, 4-ethylcatechol, pyrogallol, 3-methylcatechol, and 4-methylcatechol in coffee drinks prepared from coffee beans that have been roasted at 190° C. to 280° C. for 4 minutes.

Figure 4:
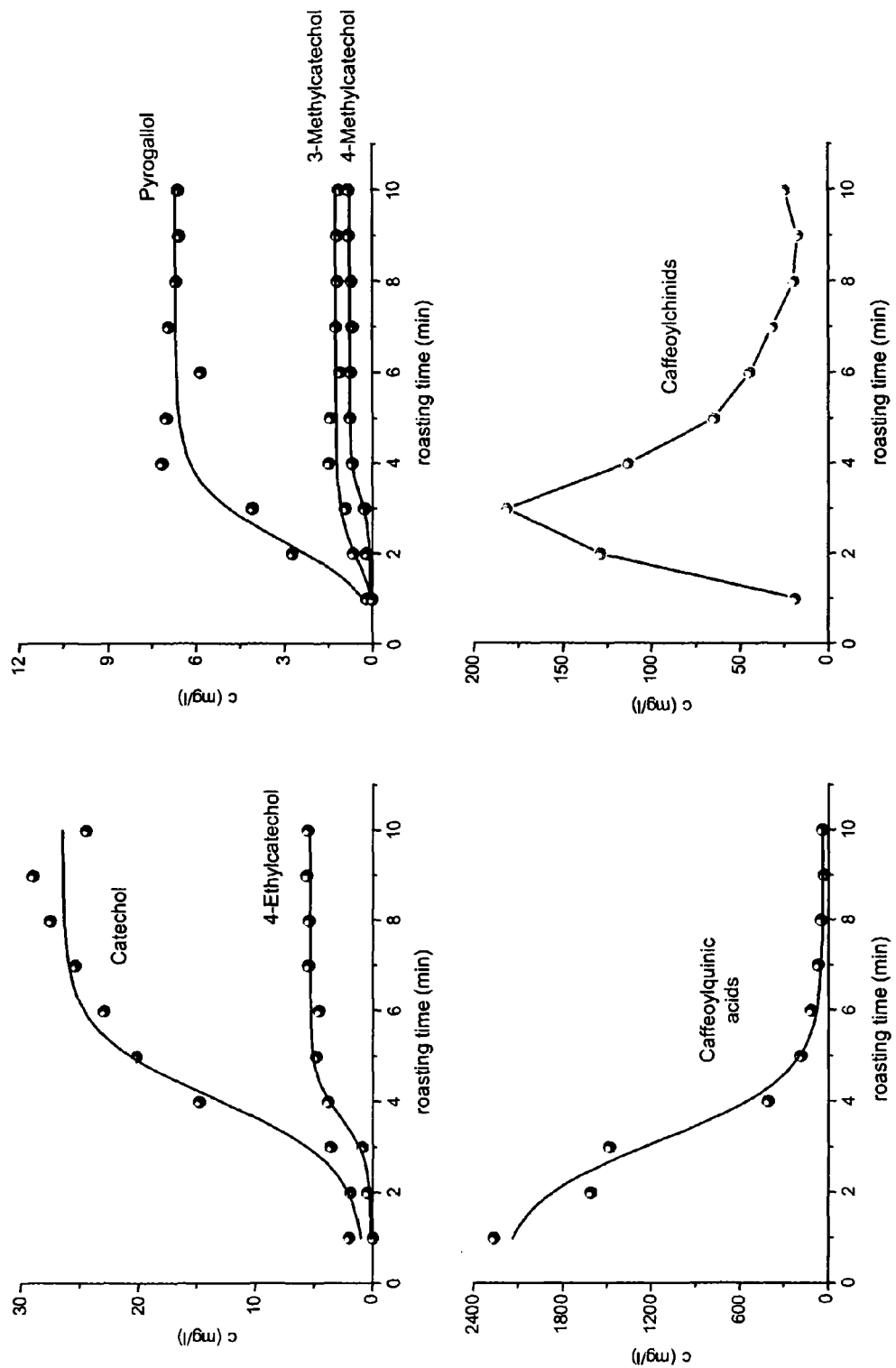

FIG. 4: Quantitative analysis of caffeoylquinic acids, caffeoylchinids, catechol, 4-ethylcatechol, pyrogallol, 3-methylcatechol, and 4-methylcatechol in coffee drinks prepared from coffee beans that have been roasted at 260° C. for 1 to 10 minutes.

Figure 5:
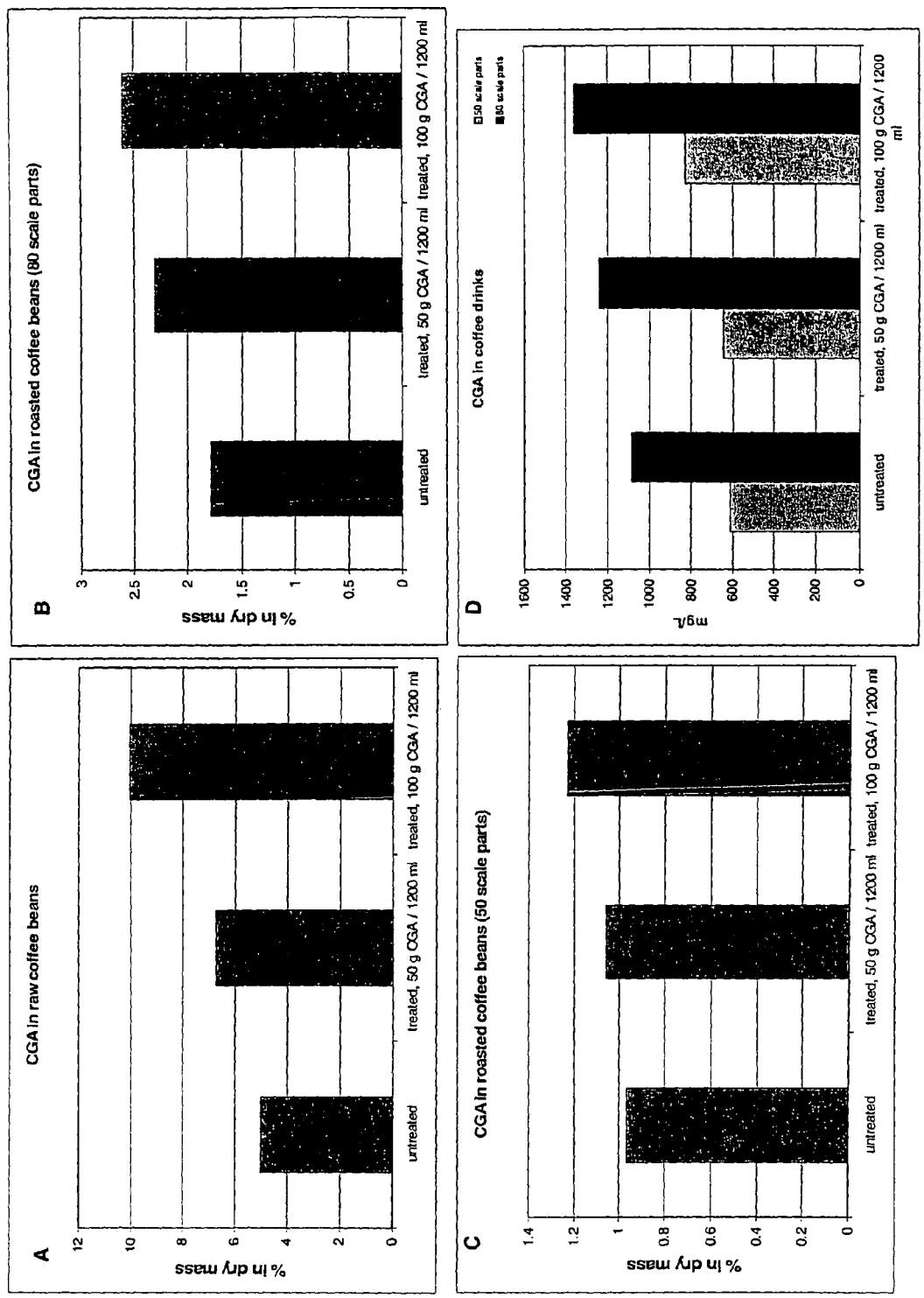

FIGS. 5A, 5B, 5C, and 5D: CGA content in CGA-spiked green coffee beans (FIG. 5A), medium roasted coffee beans (FIG. 5B), and dark roasted coffee beans (FIG. 5C), as well as in coffee drinks prepared from said medium and dark roasted coffee beans (FIG. 5D).

Figure 6:
Figure 6:
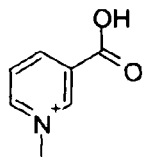
Figure 6:
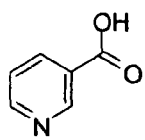
Figure 6:
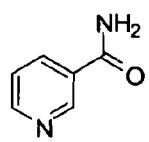
Figure 6:
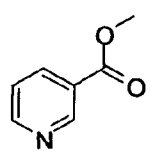
Figure 6:
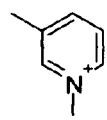
Figure 6:
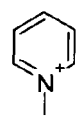
Figure 6:
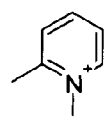
Figure 6:
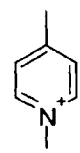

FIG. 6: Structures of caffeine, trigonelline, and trigonelline degradation products.

Figure 7:
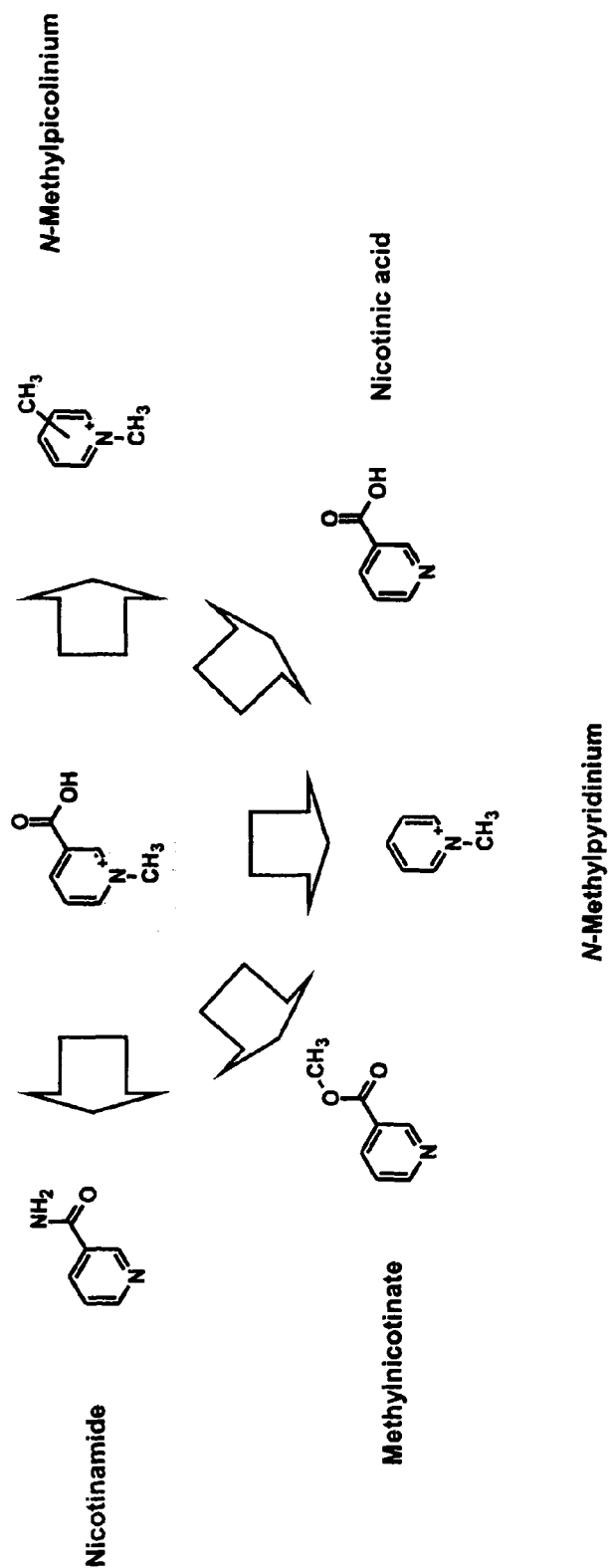

FIG. 7: Schematic overview of the degradation of trigonelline during roasting of green coffee beans.

Figure 8:
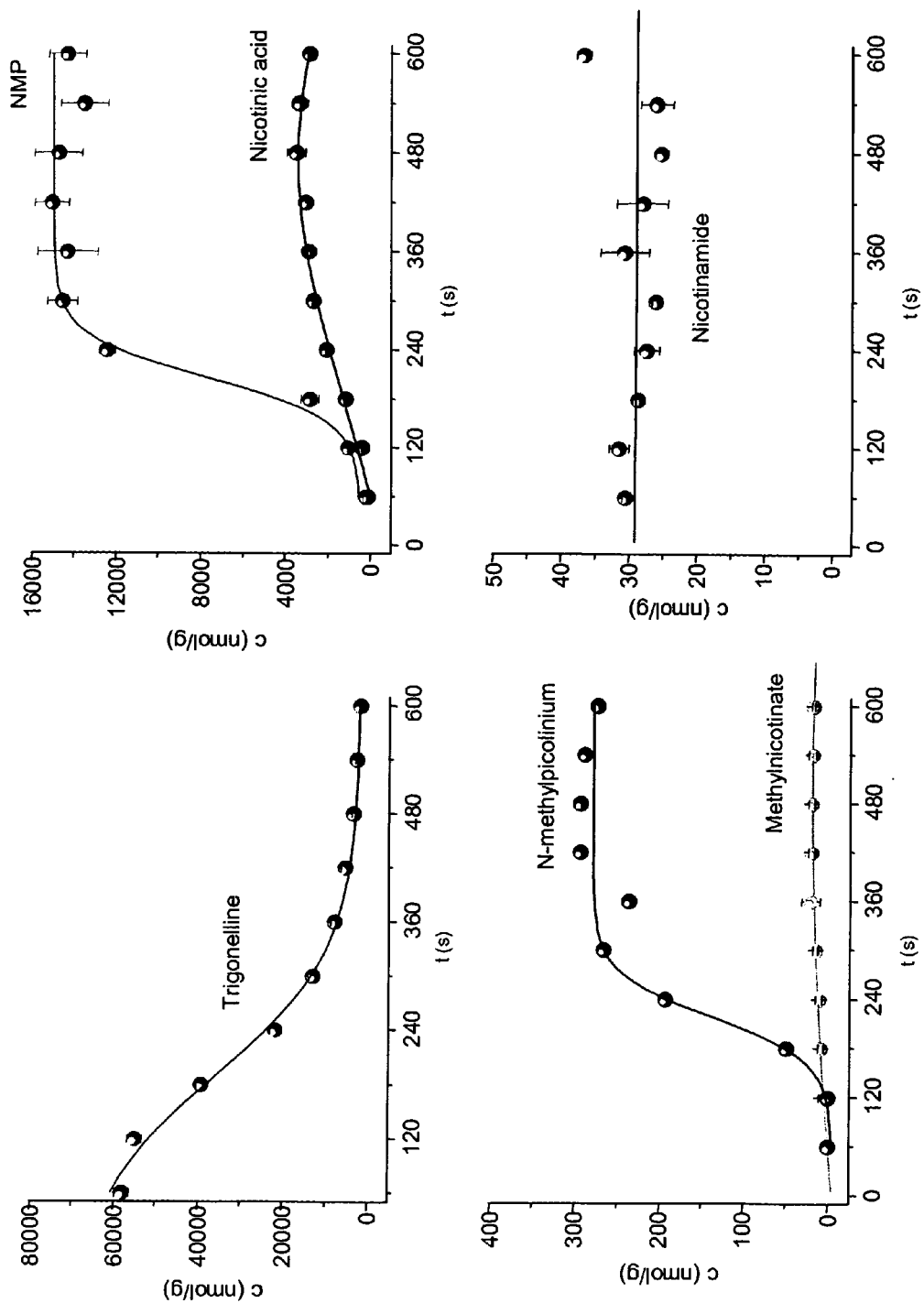

FIG. 8: Quantitative analysis of trigonelline, NMP, nicotinic acid, N-methylpicolinium, methylnicotinate, and nicotinamide in coffee drinks prepared from coffee beans that have been roasted at 260° C. for 1 to 10 minutes.

Figure 9:
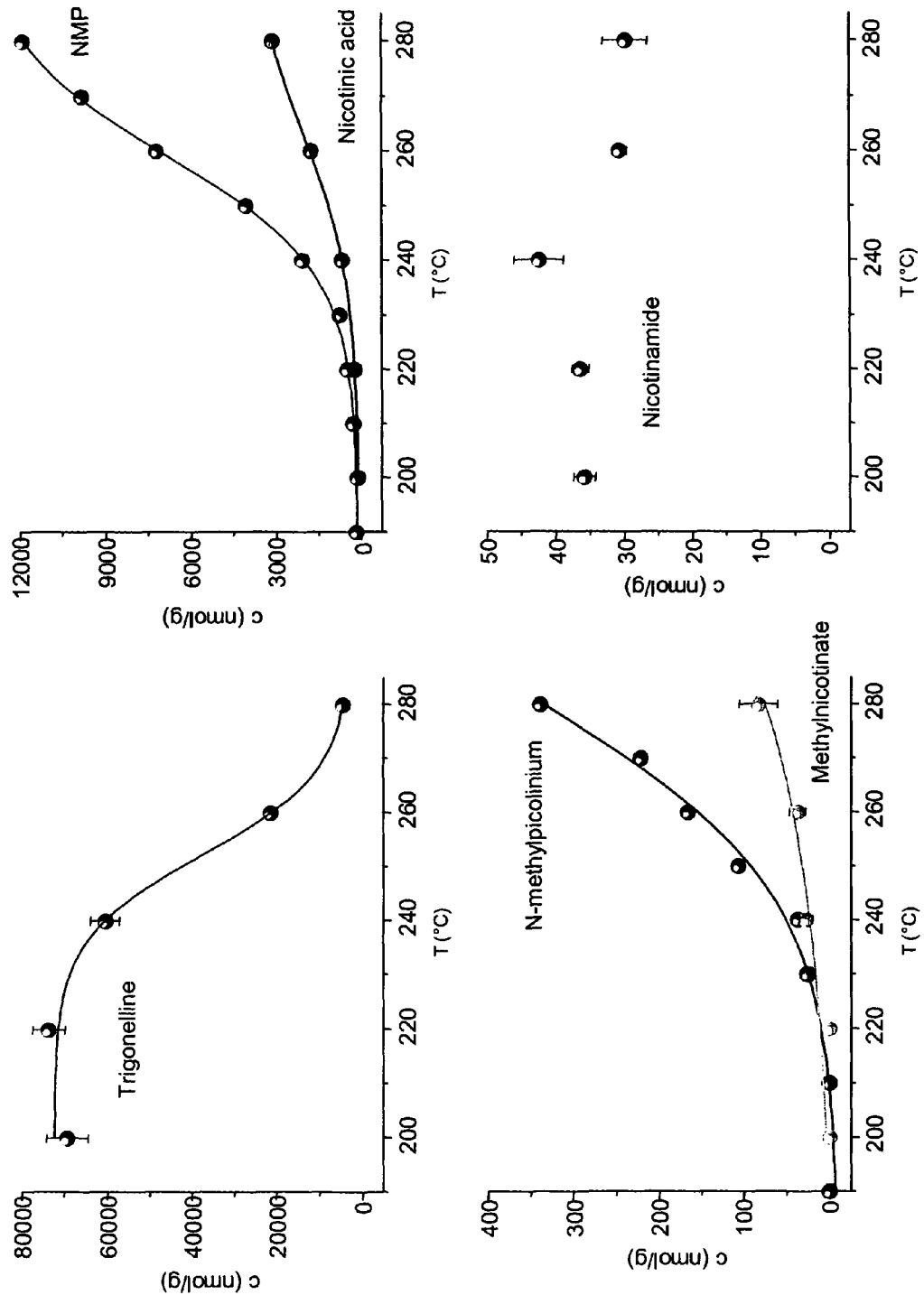

FIG. 9: Quantitative analysis of trigonelline, NMP, nicotinic acid, N-methylpicolinium, methylnicotinate, and nicotinamide in coffee drinks prepared from coffee beans that have been roasted at 190° C. to 280° C. for 4 minutes.

Figure 10:
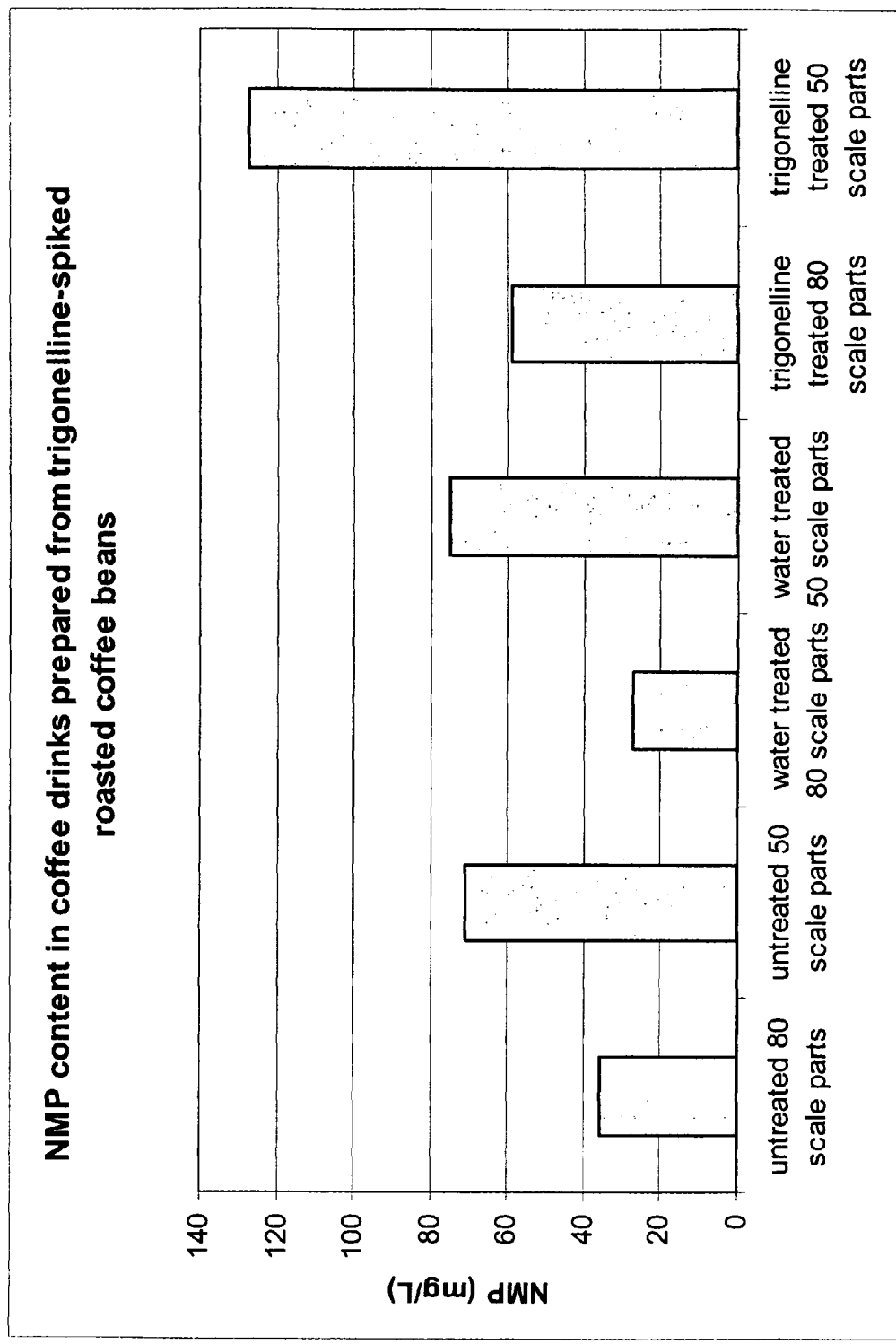

FIG. 10: NMP content in coffee drinks prepared from medium and dark roasted coffee beans that have been spiked with trigonelline before roasting.

Figure 11A:
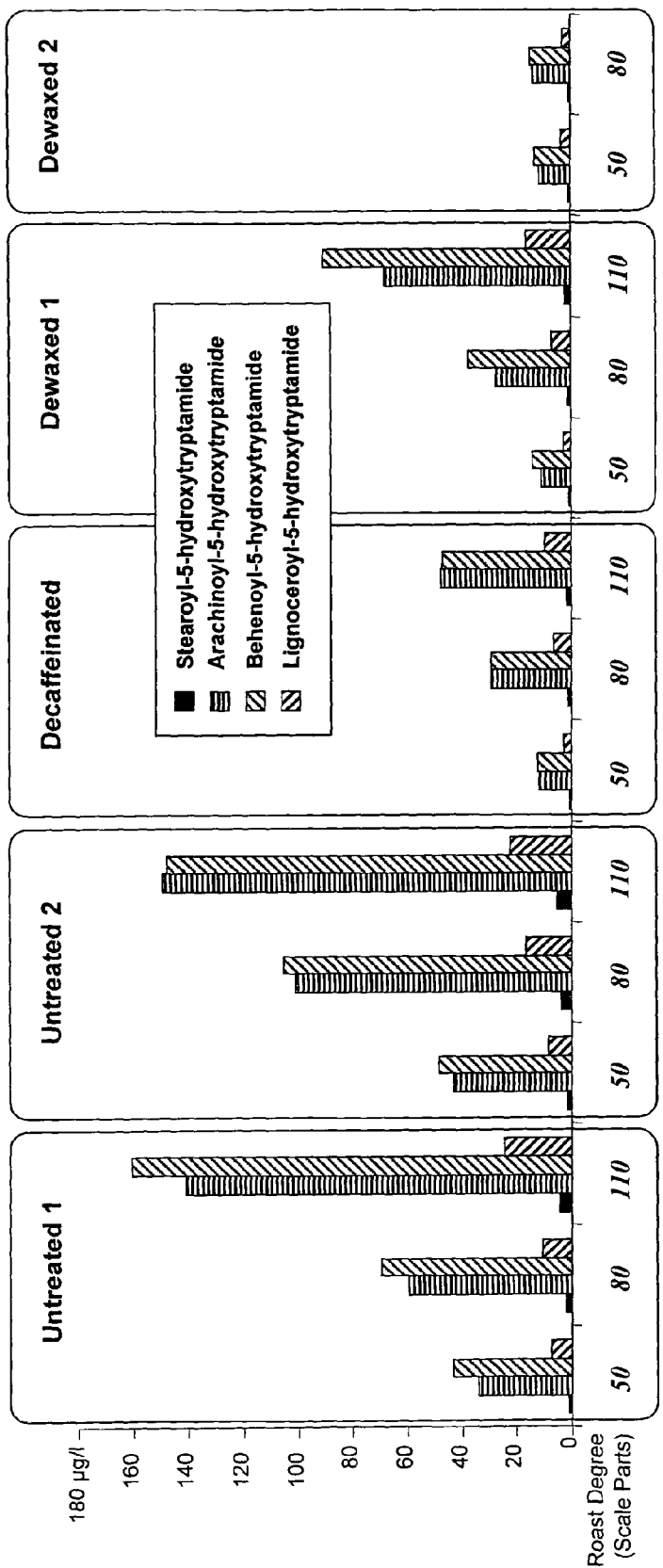
Figure 11:
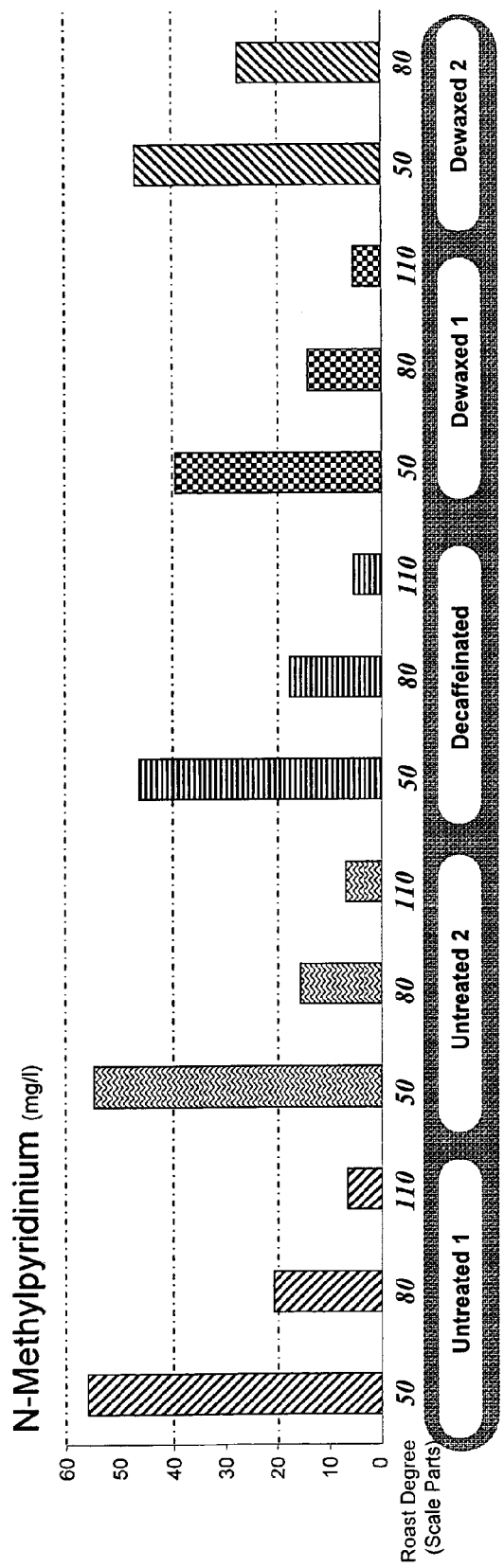
Figure 11:
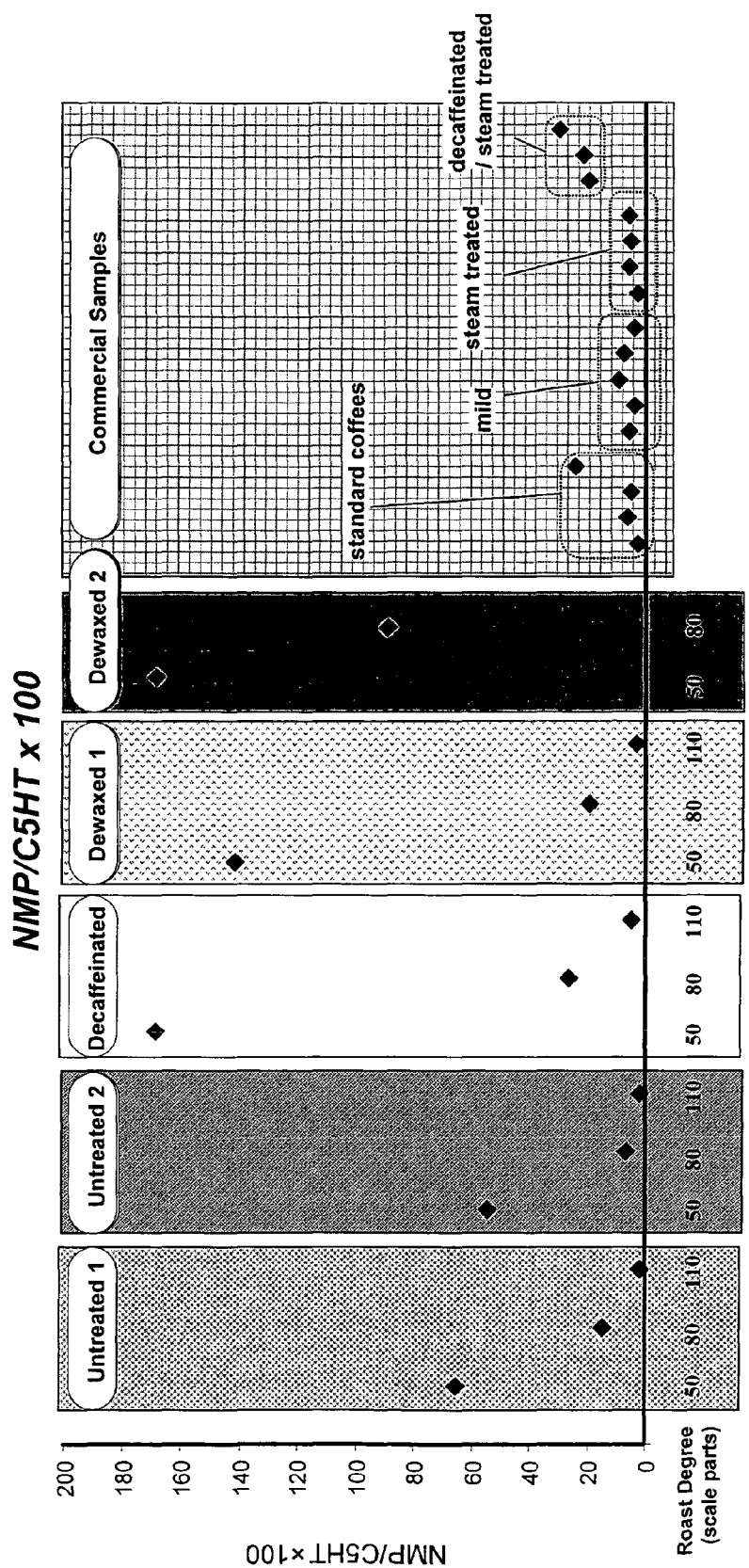

FIGS. 11A, 11B, and 11C: Content of four different C5-HT in coffee drinks prepared from dewaxed or decaffeinated coffee beans after roasting to a light, medium or dark degree (FIG. 11A), NMP content of said coffee drinks (FIG. 11B), and ratio NMP/C5-HT*100 for said coffee drinks and for coffee drinks prepared from commercially available coffee beans (FIG. 11C).

Figure 12:
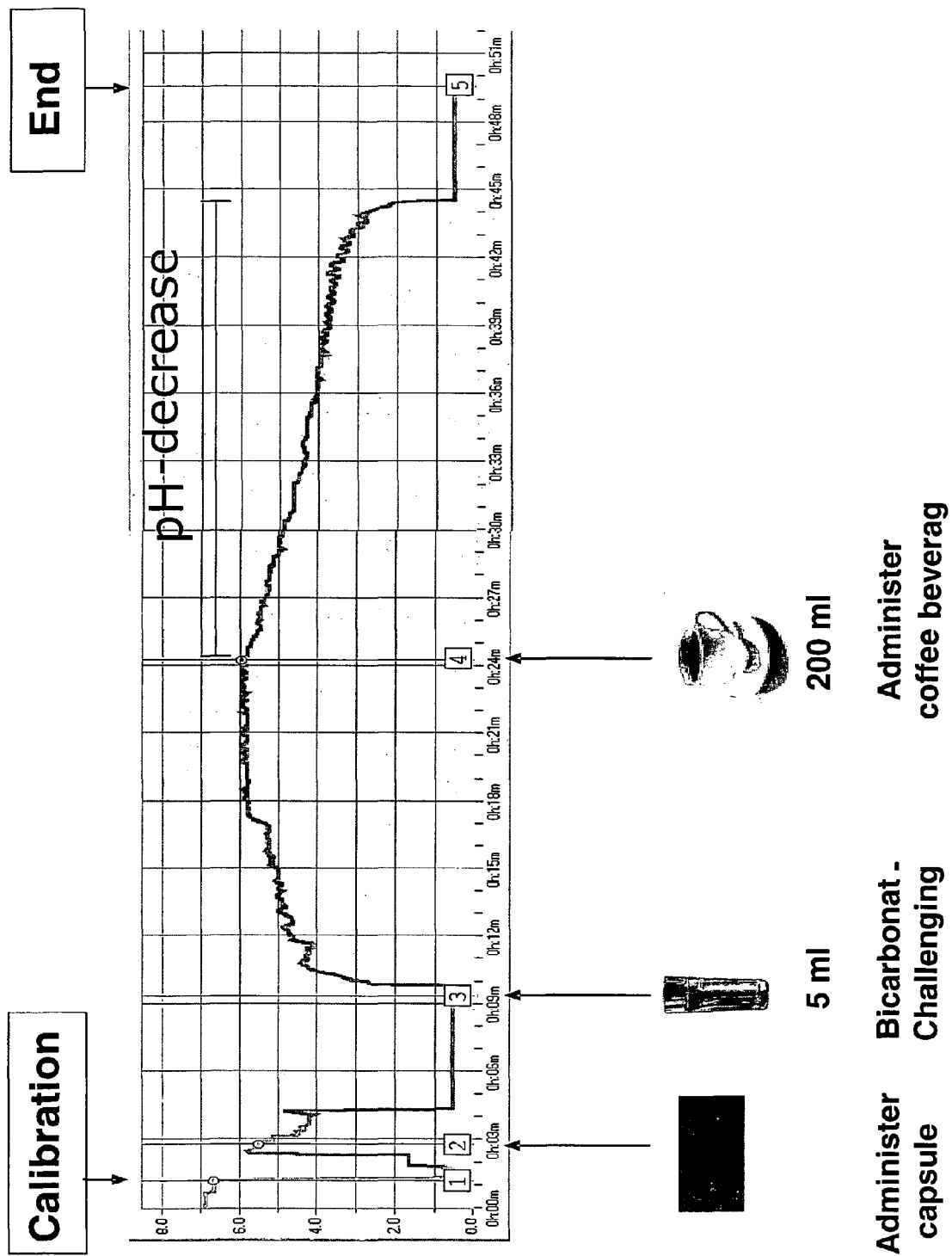

FIG. 12: Evaluation of gastric secretion using a Heidelberg pH probe as a small capsule, that can easily be swallowed by the probands and will transmit the pH of the environmental liquids permanently during its course through the human stomach and—if required—through the entire gastro-intestinal tract.

Figure 13:
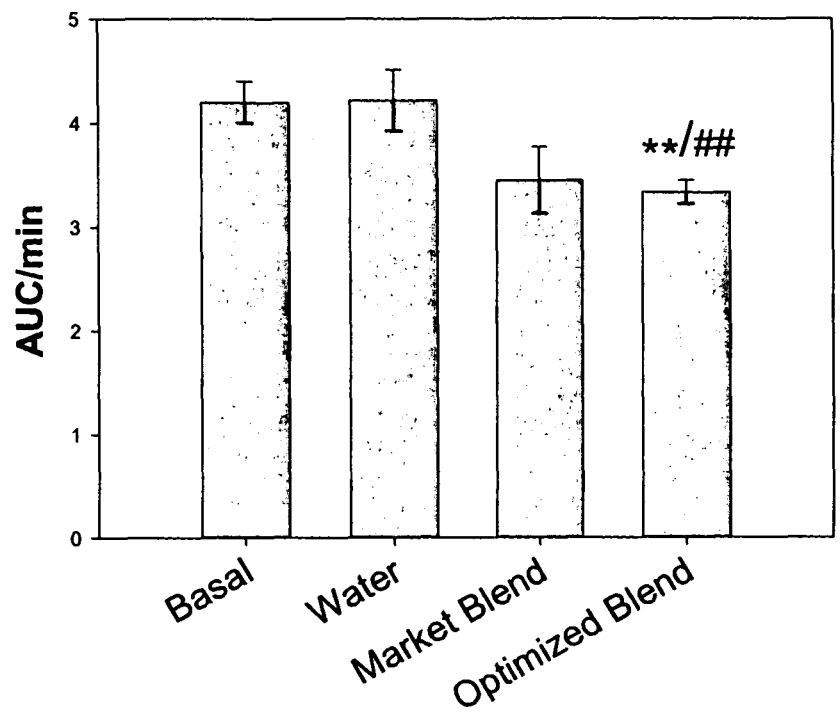

FIG. 13: Comparison of the effects of an optimized blend with those of a market blend, a mere water administration (=Control) and basal (=non-treatment).

Figure 14:
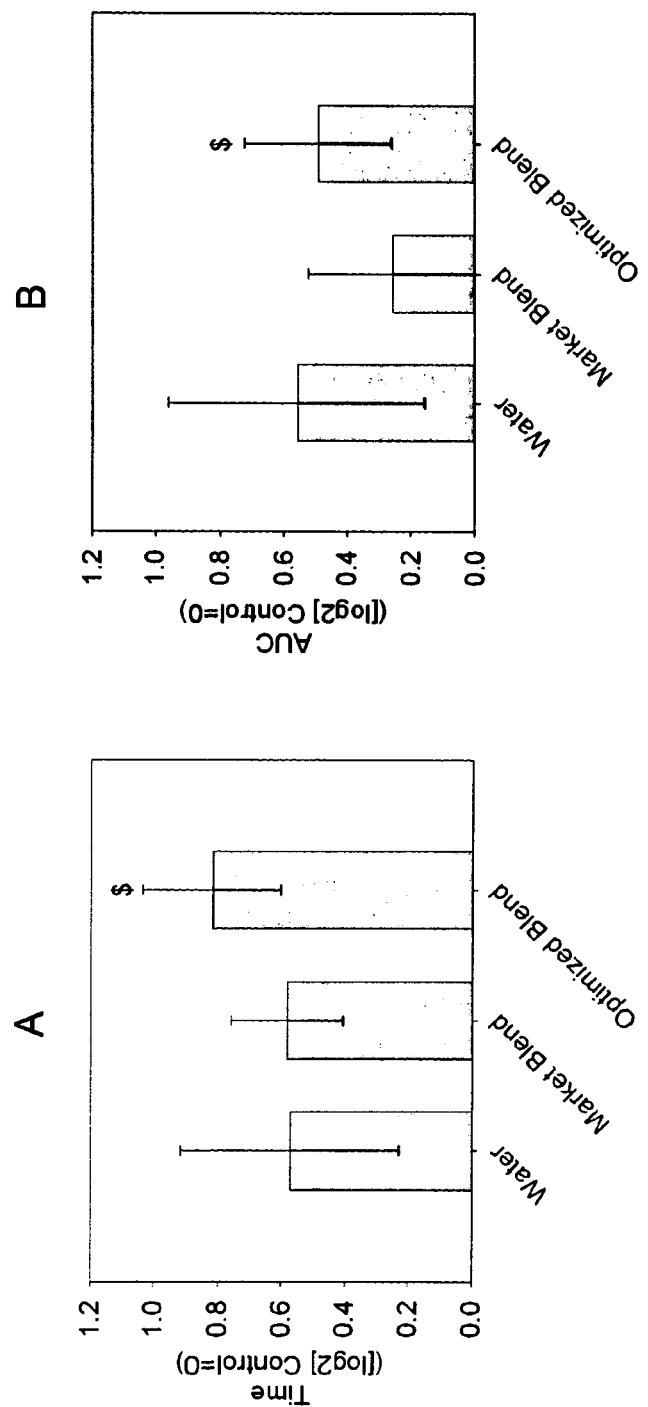

FIG. 14: $\log_2$ transformed data calculated relatively from the basal secretion time (A) or AUC (B) of each individual volunteer (Statistics: paired t-test, one-sided, $=p<0.05, n=9).

Figure 15:
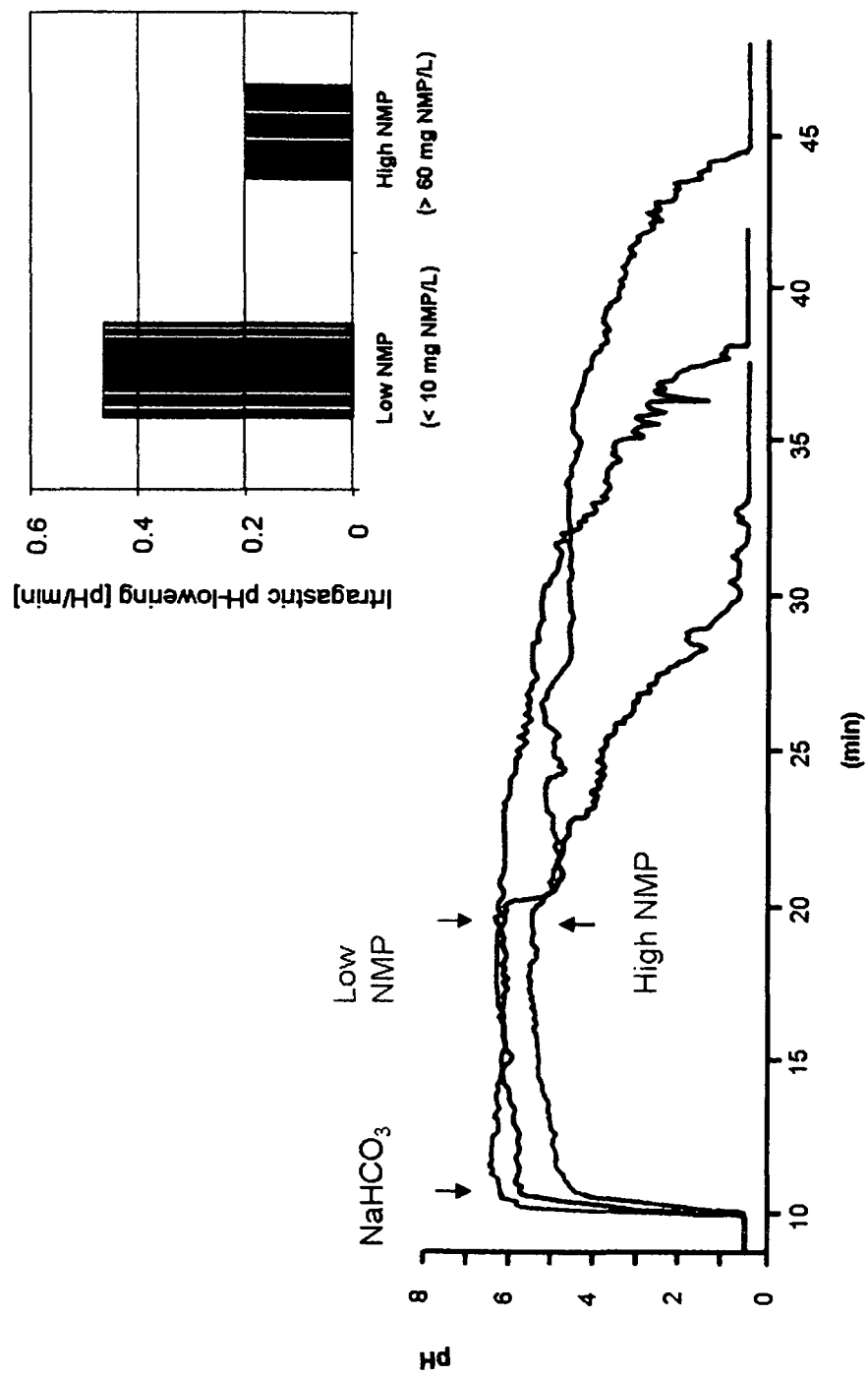

FIG. 15: Comparison of the distinct time courses of pH-restoration after Bicarbonate-Challenge: Basal (black curve, no further treatment), low NMP coffee (red curve), and high NMP coffee, respectively. It is clearly demonstrated that high NMP coffee prolongs the period of pH restoration after alkaline bicarbonate challenge, indicating an inhibitory effect on gastric acid secretion.

Figure 16:
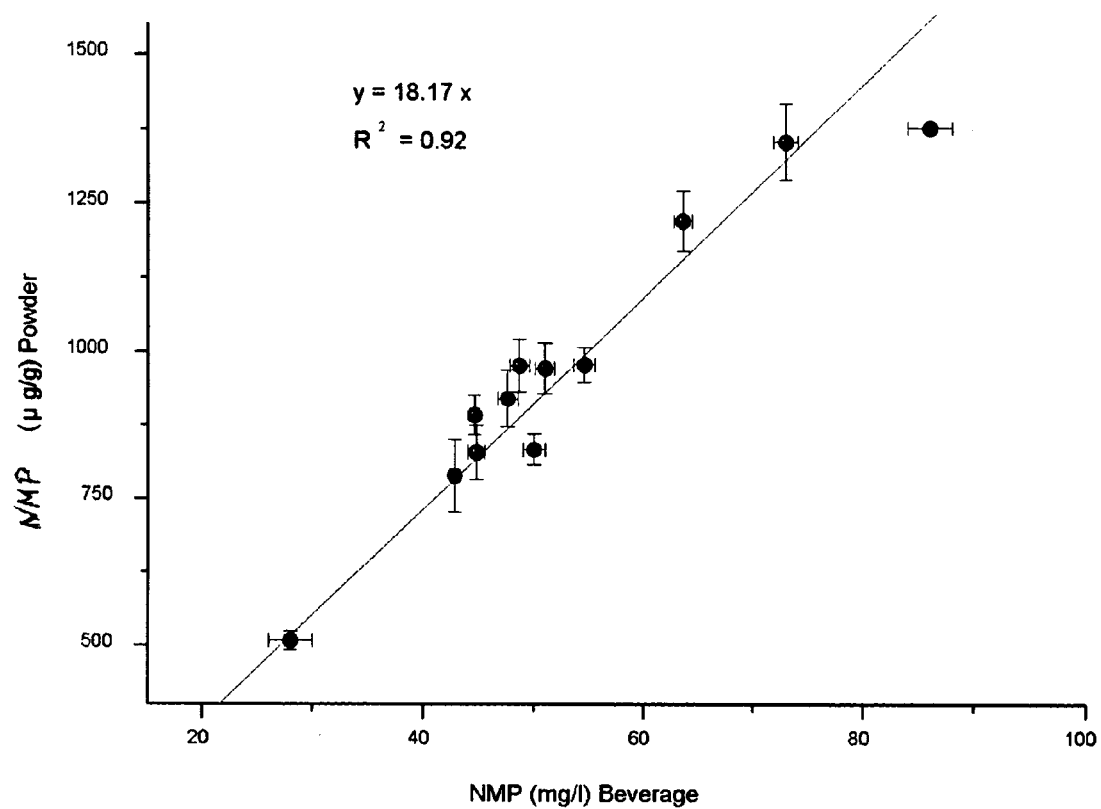

FIG. 16: Correlation of quantitative Data of NMP in a drink and NMP in a powder.

Figure 17:
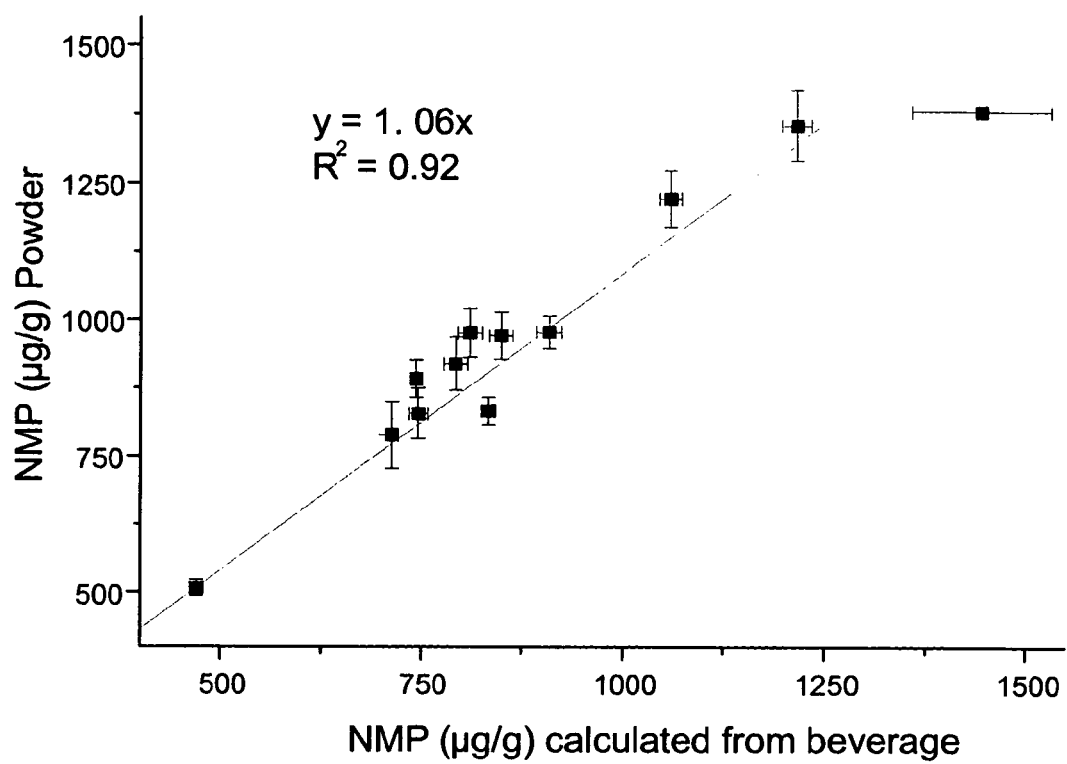

FIG. 17: Correlation of NMP Data in the powder (μg/g) with the data of theoretical NMP content in powder calculated from drink concentrations.

Figure 18:
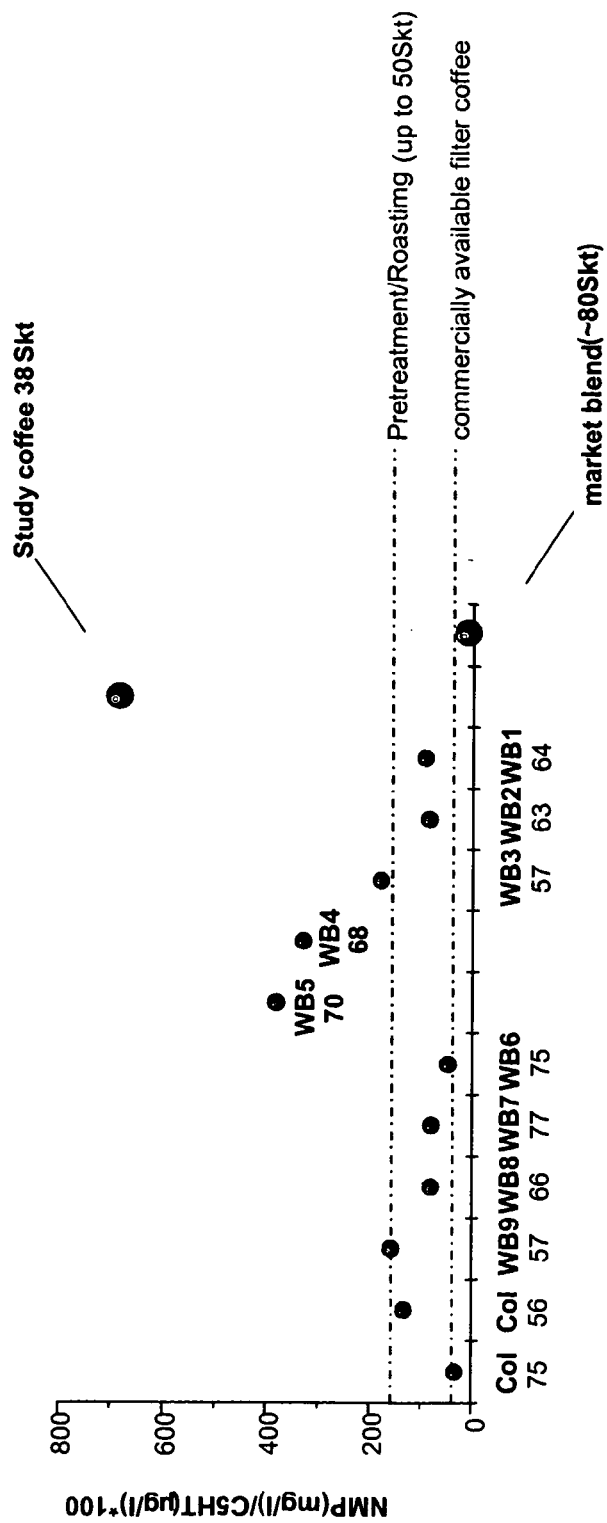

FIG. 18: NMP(mg/l)/C5HT(μg/l)×100 of competitors' coffee (WB), study coffee and reference coffee. The numbers on the X-axis designate the roast color in scale parts.

Figure 19:
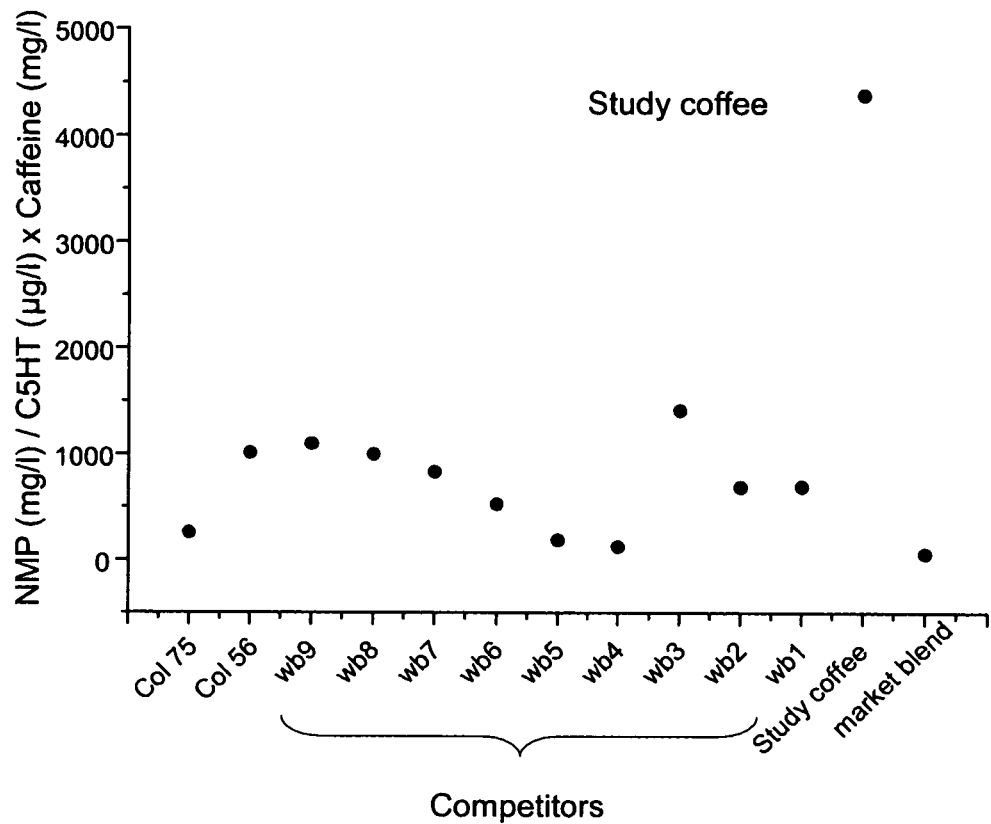

FIG. 19: Advanced Index: NMP/C5HTxCaffeine

Figure 20:
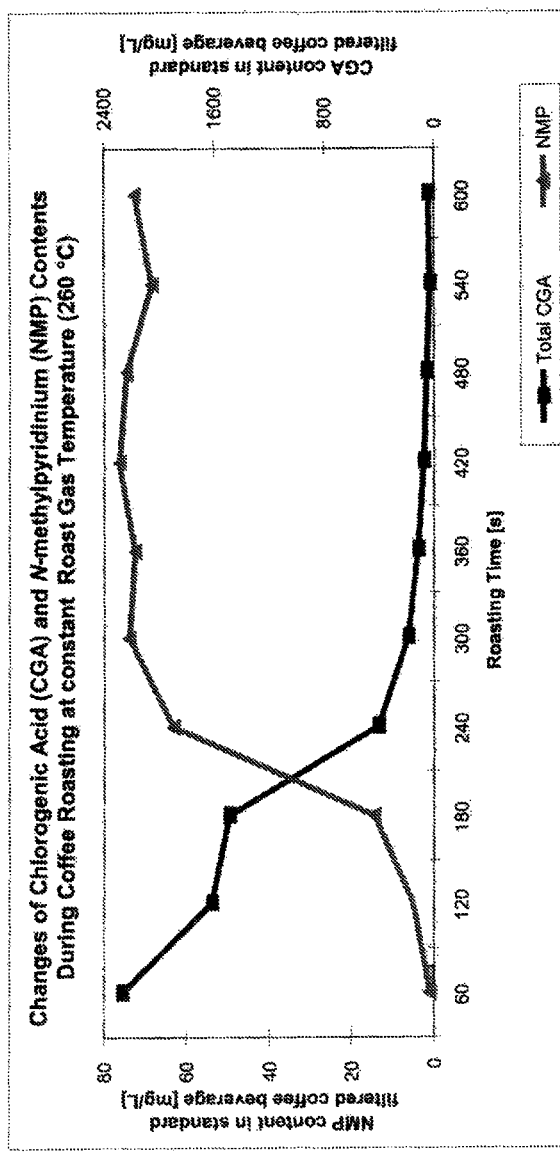

FIG. 20: Changes of Chlorogenic Acid (CGA) and N-methylpyridinium (NMP) Contents During Coffee Roasting at constant Roast Gas Temperature (260° C.)

Figure 21:
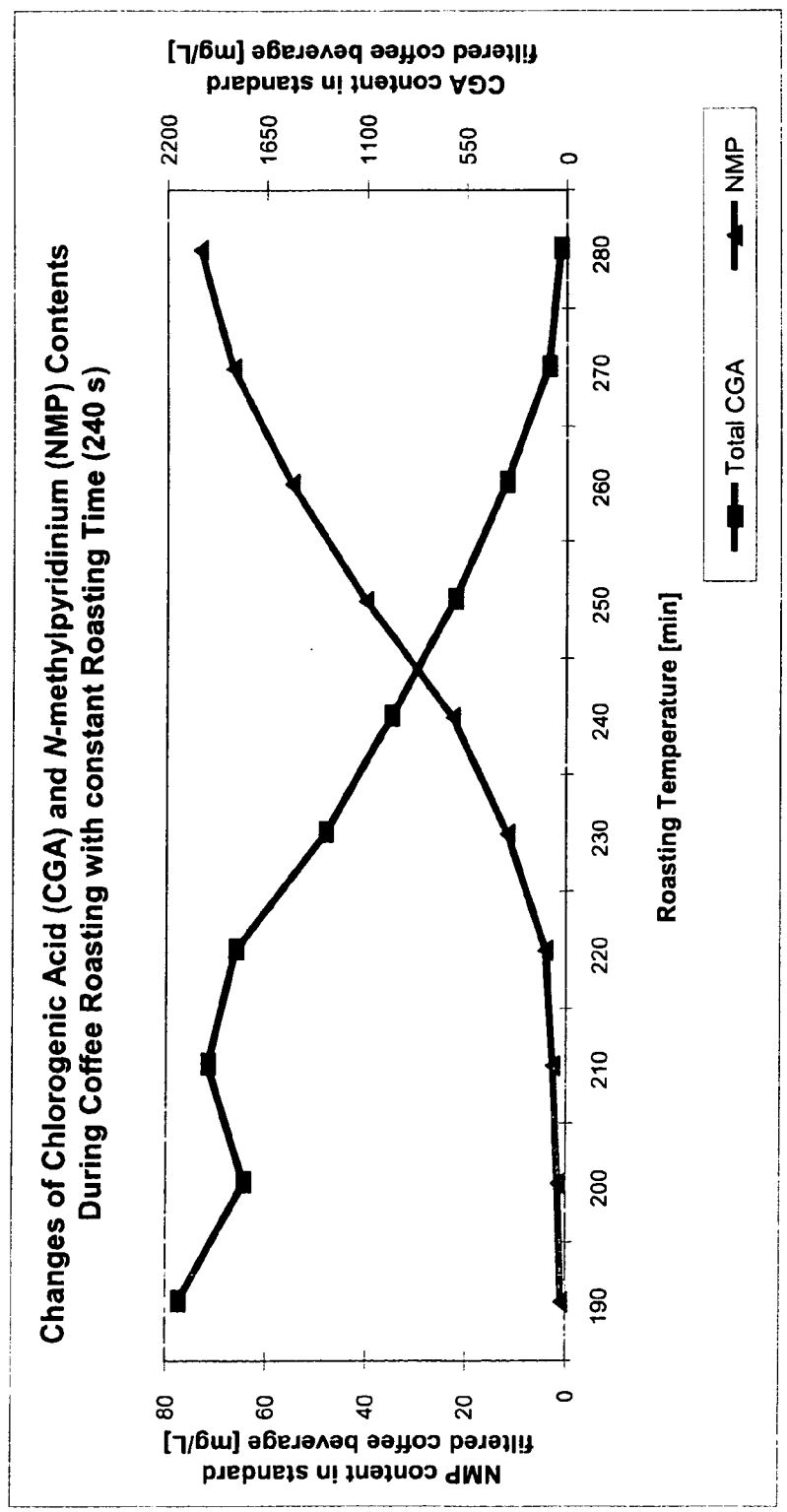

FIG. 21: Changes of Chlorogenic Acid (CGA) and N-methylpyridinium (NMP) Contents During Coffee Roasting with constant Roasting Time (240 s)

FIG. 22: Batch Roasting in a Drum (Drawings modified, taken from Deutscher Kaffeeverband.de): The batch roasting uses contact heat via the "frying pan principle". The batch roasting process is carried out in a roasting time of 8 to 20 minutes.

FIG. 23: Drum Roasting Machine (Drawings modified, taken from Deutscher Kaffeeverband.de)

FIG. 24: Fluidized Bed Roaster (Drawings modified, taken from Deutscher Kaffeeverband.de): The roasting in a fluidised bed allows shorter roasting times. Using convection heat the batch roasting process requires a roasting time of 1.5 to 8 minutes.

FIG. 25: Rotary Fluidized Bed Roaster by Neuhaus Neotec.

1.=Roasting chamber, 2.=Cooling chamber, 3.=Roaster cyclone, 4.=Main burner, 5.=Roaster fan, 6. Catalytic afterburner system, 7.=Roaster feed bin, 8.=Roaster discharge bin, 9.=Cooler fan, 10.=Cooler cyclone, 11.=Quench system, 12.=flap diverter, 13.=Sound absorber, 14.=Outlet sound absorber, 15.=Filter The present invention will now be further illustrated in the following examples without being limited thereto.

EXAMPLES

Example 1

Degradation of Chlorogenic Acids During Roasting of Green Coffee Beans

During roasting of green coffee beans, chlorogenic acids are strongly degraded by pyrolysis (cf. FIG. 2). The most abundant chlorogenic acids in coffee are caffeoylquinic acids. Therefore, degradation of 3-, 5-, and 4-O-caffeoylquinic acid and generation of caffeoylchinids and the hydroxybenzenes catechol, pyrogallol, 3- and 4-methylcatechol, and 4-ethylcatechol (cf. FIG. 1) during roasting of green coffee beans was determined by measuring the concentration of the above compounds in hot water extracts. Samples were roasted at 190° C. to 280° C. for 4 minutes (FIG. 3) and at 260° C. for 1 to 10 minutes (FIG. 4).

As can be taken from FIG. 4, caffeoylquinic acids are rapidly degraded at 260° C., with 80% of the compounds being pyrolyzed between 2 and 4 minutes. At the same time, methylcatechols, pyrogallol and caffeoylchinids are generated. While the chinids are rapidly degraded after reaching their maximum concentration at 3 minutes, the concentration of the above hydroxybenzenes remained constant, wherein the most abundant hydroxybenzenes are catechol and 4-ethylcatechol.

Example 2

Spiking of Green Coffee Beans with Chlorogenic Acids

Dominant Bath.

Green coffee beans from a Brasil coffee were spiked with chlorogenic acids by vacuum infiltration. To this end, a so called "dominant bath" was generated first by repeatedly soaking green coffee beans in a water bath and then discarding the beans. That way, an equilibrium between the dominant bath and the green coffee beans was reached. Spiking was performed in this dominant bath, in order to avoid leaching of any compounds during the spiking procedure.

Spiking Procedure.

Spiking of the green coffee beans with chlorogenic acids was performed by vacuum infiltration, wherein the coffee beans were covered with the spiking solution, i.e. the dominant bath with chlorogenic acids dissolved therein and a vacuum was applied (200 mbar or less) for 30 minutes. Afterwards the spiking solution was discarded and the green coffee beans were carefully dried for 6 hours at 40° C. until the initial water content of the coffee beans prior to treatment was re-adjusted (11%). The spiking solution contained all six chlorogenic acids (neo-, n-, and krypto-chlorogenic acid, as well as iso-1-, iso-2-, and iso-3-chlorogenic acid).

Results.

Green coffee beans were treated in spiking solution containing 50 g or 100 g chlorogenic acids in a volume of 1200 ml. Untreated coffee beans and coffee beans that were treated with a spiking solution containing no chlorogenic acids were used as controls. Table 1 and FIG. 5A show contents of caffeine and CGA.

TABLE 1

Content of caffeine and CGA in green coffee beans spiked with CGA

| Sample | caffeine [% in dry mass] | CGA [% in dry mass] |
|---|---|---|
| untreated | 1.09 | 4.99 |
| treated, 50 g CGA/1200 ml | 1.10 | 6.71 |
| treated, 100 g CGA/1200 ml | n.d. | 10.05 |

The similar caffeine contents of treated and untreated coffee show that leaching in the spiking solution was very low. At the same time, spiking with CGA could significantly increase the CGA content of green coffee beans. The treated and untreated coffee beans were then roasted to roast degrees of 80 scale parts and 50 scale parts, respectively, and the CGA content was determined. Results are shown in Table 2 and FIGS. 5B and 5C.

TABLE 2

Content of CGA in roasted coffee beans spiked with CGA

| | CGA [% in dry mass] | |
|---|---|---|
| Sample | roast degree 80 scale parts | roast degree 50 scale parts |
| untreated | 1.78 | 0.97 |
| treated, 50 g CGA/1200 ml | 2.31 | 1.06 |
| treated, 100 g CGA/1200 ml | 2.60 | 1.23 |

As can be taken from the above data, the increase in CGA that is seen in green coffee beans that were spiked with CGA can also be seen in roasted coffee beans, particularly in dark roasted beans (50 scale parts), wherein the CGA content is up to 25% higher than in beans that were not spiked with CGA and in light roasted beans (80 scale parts) where the CGA content is up to 50% higher than in beans that were not spiked with CGA. CGA contents of coffee drinks that were prepared from the above coffee beans are shown in FIG. 5D. As can be taken from said Figure, the increased CGA content seen in roasted coffee beans that were spiked with CGA can also be seen in the respective coffee drink, again particularly in a coffee drink brewed from the dark roasted beans.

In summary, green coffee beans can be spiked with CGA which can result in an increased CGA content in the roasted coffee beans, particularly in dark roasted beans, as well as in an increased CGA content in the respective coffee drink.

Example 3

Degradation of Trigonelline During Roasting of Green Coffee Beans

During roasting of green coffee beans, trigonelline is strongly degraded (cf. FIG. 7). Therefore, degradation of trigonelline and generation of the degradation products NMP, nicotinic acid, N-methylpicolinium, methylnicotinate, and nicotinamide (cf. FIG. 6) during roasting of green coffee beans was determined by measuring the concentration of the above compounds in hot water extracts. Samples were roasted at 260° C. for 1 to 10 minutes (FIG. 8) and at 190° C. to 280° C. for 4 minutes (FIG. 9).

As can be taken from FIG. 8, the concentration of trigonelline followed a sigmoid curve, wherein the concentration decreased strongest during the first 4 minutes at 260° C. NMP was generated between 2 and 4 minutes, with the maximum concentration already reached after 4 minutes. Further roasting did not result in further NMP generation. The same holds true for N-methylpicolinium, although its concentration was 50-fold lower than that of NMP. Nicotinic acid was generated during the first 7 minutes before its concentration decreased again. The same behavior was seen for methylnicotinate, the concentration of which was 50- to 70-fold lower. The concentration of nicotinamide remained constant throughout the roasting process.

As can be taken from FIG. 9, roasting for 4 minutes at 220° C. was not sufficient to significantly pyrolyze trigonelline. Trigonelline degradation and generation of its degradation products started with roasting at 240° C. for 4 minutes. The generation of NMP started at 230° C., with the strongest generation of NMP between 240° C. and 260° C. N-methylpicolinium was generated at 230° C. and showed an exponential curve. The concentration of nicotinic acid as well as that of methylnicotinate increased at 240° C. The concentration of nicotinamide remained constant over the temperatures tested.

In summary, NMP is the dominant degradation product of trigonelline, with 25% of trigonelline being degraded to NMP. The maximum concentration of NMP was reached after roasting for 5 minutes at 260° C. However, in this time only 70% of the trigonelline were degraded. After 5 minutes, the concentration of NMP remained stable, whereas methylnicotinate and nicotinic acid were further generated. As a consequence, the NMP concentration can be increased by roasting, but only to a certain extent that is defined by the natural trigonelline content of the green coffee beans.

Example 4

Spiking of Green Coffee Beans with Trigonelline

Green coffee beans from a Brasil coffee were spiked with trigonelline by lyophilization, then dried and roasted to a medium and a dark degree. Table 3 and FIG. 10 show the NMP content in coffee drinks prepared from said roasted beans. Untreated and water treated coffee beans were used as controls.

Spiking Procedure.

Spiking of the green coffee beans with trigonelline was performed by adding aqueous trigonelline chloride (Fluka) solution to green coffee beans, and subsequent submission to lyophilisation until the initial water content of the coffee beans prior to treatment was re-adjusted (11%). The dosage of external trigonelline equaled 9 mmol/kg green coffee or 12.6 TrigxHCl (Fluka) per kg green coffee.

TABLE 3

NMP content in coffee beverages prepared from roasted coffee beans that were spiked with trigonelline (9 mmol/kg green coffee)

| Sample | NMP [mg/L] |
| --- | --- |
| untreated 80 scale parts | 35.59 |
| untreated 50 scale parts | 71.18 |
| trigonelline treated 75 scale parts | 58.75 |
| trigonelline treated 52 scale parts | 127.28 |

As can be taken from the above data, the NMP content in a coffee drink can be increased by spiking green coffee beans with trigonelline.

Example 5

Ratio Between the Concentrations of NMP and CGA in Coffee Drinks

The ratio between the concentration of NMP and the concentration of CGA was determined in coffee drinks brewed according to the standard procedure. The coffee beans were ground with the same mill to a fineness of 420 µm. Respective data coffee drinks that have been brewed from blended coffee beans that have been roasted to different degrees are shown in Table 4.

TABLE 4

Roast degree, NMP content, CGA content and ratio between NMP and CGA for roasted coffee bean samples

| Roasting | Roast degree [scale parts] | NMP [mg/L] | CGA [mg/L] | ratio CGA/NMP |
| --- | --- | --- | --- | --- |
| dark | 57 | 71.7 | 580.1 | 8.09 |
| dark | 57 | 68.8 | 564.4 | 8.20 |

Example 6

Reduction of C5-HT in Green Coffee Beans

C5-HT are main mediators of coffee-specific gastric acid secretion and stomach irritation in sensitive persons. Since C5-HT are contained in the wax layer that covers untreated green coffee beans, dewaxing green coffee beans can significantly reduce C5-HT. Since the same solvents are used for dewaxing and for decaffeinating green coffee beans, decaffeinating is equally effective for reducing C5-HT.

Accordingly, green coffee beans were dewaxed or decaffeinated and then roasted to different degrees. C5-HT contents were analyzed in coffee drinks that were prepared from said beans (FIG. 11A). Further, NMP contents in the above coffee drinks were analyzed (FIG. 11B) and a ratio of the NMP concentration to the 5-HT concentration defined (NMP/C5-HT*100, FIG. 11C).

Example 7

Secretion of Gastric Acid

Nine healthy volunteers were asked to undergo the experiment as designed here. An optimized blend (NMP-rich, C5-HT-deprived) was tested against an ordinary coffee which was composed of five major retail coffees of the German market in equal parts (i.e. 20% g/g each).

The optimized blend comprises the following:
30% (w/w) dewaxed coffee beans of *Coffea arabica* that have been roasted by rotary fluidized bed (RFB) roasting for 3 minutes at 260° C. to a roast degree of about 80 scale parts; and
70% (w/w) dewaxed coffee beans of *Coffea arabica* that have been drum roasted for 20 minutes at 200° C. to a roast degree of about 50 scale parts.

The coffee beverages were produced in a standard filter coffee machine. The beverage was consumed in the morning, empty-stomached within 1 min, and with a temperature of approximately 35° C. Water served as control. The outcome was expressed as Changes in Area under the Curve per time [AUC/min] and for further demonstrating the significant positive effect the data were submitted to a log 2-transformation as shown in FIG. 12.

Assuming a null hypothesis, the market blend coffee may stimulate the secretion of gastric acid in a stronger way than the optimized blend a one-sided statistical approach was used. As a result, the administration of the optimized blend prolonged the period to restore the initial pH after alkaline bicarbonate challenge more effectively than the market blend coffee. These results are confirmed by the data of the log 2 transformation as shown in FIG. 13.

Thus for an optimized coffee blend, a significant reduction of gastric acid secretion as compared to an ordinary coffee could be demonstrated.

As shown in FIG. 14A one, the application of the optimized blend caused a significantly longer response time to return to the initial pH value. In accordance, also the area under the curve (AUC) was significantly bigger for the optimized blend than the market blend (FIG. 14B). The one-sided statistical comparison was performed since it was expected that the optimized C5HT-deprived and NMP-rich coffee blend stimulates gastric acid secretion weaker than the medium roasted market blend because of similar results in former experiments as shown in FIG. 15.

Example 8

Extraction of the NMP from the Powder into the Drink

In FIG. 16 the Y axis shows the quantitative data of NMP in coffee powder (μg/g) whereas the X axis shows the NMP concentration obtained in the coffee drink (mg/l). The standard coffee drink is prepared by brewing 48 g of coffee powder with 900 ml water obtaining ~820 ml (±50 ml) coffee drink.

In order to convert the values obtained from the coffee drink to the values present in the coffee powder, the concentration obtained from the drink (mg/l) should be multiplied with 0.82 l and should be divided by the amount of coffee powder used. The multiplication with 1000 converts the NMP concentration from mg/l to μg/l, so that the result is obtained in μg/g (ppm).

$$c(NMP_{Powder}) = c(NMP_{Drink}, mg/l) \times 1000 \times \frac{0.82\ l}{48\ g}$$

When summarizing the quotients the conversion factor is calculated which depends on the amount of drink obtained. Using typical amounts of drink the factor is 17.1.

$$c(NMP_{Powder}) = c(NMP_{Drink}, mg/l) \times 17.1$$

When the quotient of the gradient of the linear compensation function forced through 0 and obtained from the present reference data (=empirical actual value) and the theoretical relation (factor 17.1=theoretical nominal value) is calculated, 1.06 or 106%, respectively, is obtained.

A background of this calculation is the following correlation originating from instrumental analytics for obtaining the validation parameter "recovery"

$$Recovery = 100\% \times \frac{actual}{nominal}$$

In case a series of data points is present $$Recovery = 100\% \times \frac{gradient(Compensationfuntionactual)}{gradient(Compensationfunctionnominal)}$$

When the theoretical amount in powder is calculated from the drink data (concentration NMP in mg/l) by multiplication with 0.82 l and division by 48 g (confer above) and the amounts obtained from the powder are plotted against the calculated data, the extraction recovery is directly obtained from the gradient of the linear compensation function forced through 0 as shown in FIG. 17.

Example 9

Comparison of Study Coffee, Competitors' Coffee and Reference Coffee

The NMP/C5HT index as used herein is the quotient of the NMP concentration in mg/l and the C5HT concentration in μg/l in a coffee drink multiplied with 100. In FIG. 18 such indices are shown for study coffee, competitors' coffee and reference coffee.

The study coffee comprises the following:
30% (w/w) dewaxed coffee beans of *Coffea arabica* that have been roasted by rotary fluidized bed (RFB) roasting for 3 minutes at 260° C. to a roast degree of about 80 scale parts; and
70% (w/w) dewaxed coffee beans of *Coffea arabica* that have been drum roasted for 20 minutes at 200° C. to a roast degree of about 50 scale parts.

In order to delimit study coffee from competitors' coffee, a further possibility of distinguishing caffeine containing and caffeine free coffee should be determined. Since the dewaxing results in a reduction of C5HT, but not of caffeine, the NMP/C5HT index is extended by the multiplication with caffeine content (mg/l) as shown in FIG. 19. From the data points depicted in FIG. 19, which summarize three analytical parameters per coffee, the delineation of the study coffee from all competitors' coffees or the reference coffee (market blend) is clear for a person skilled in the art.

The invention claimed is:

1. A method for producing a coffee blend, wherein the coffee blend is characterized in that a coffee drink brewed from said coffee blend under standard conditions contains at least 65 mg/L N-methylpyridinium cations (NMP) and at least 550 mg/L chlorogenic acids (CGA), comprising the steps of
   (a) providing coffee beans of *Coffea arabica* that have been drum roasted for at least 10 minutes at 190° C. to 210° C. to a dark degree of about 45 to 60 scale parts;
   (b) providing coffee beans of *Coffea arabica* that have been roasted by rotary fluidized bed (RFB) roasting for at most 5 minutes at 240° C. to 270° C. to a medium degree of about 75 to about 90 scale parts;
   (c) blending at least two components, wherein one blend component consists of coffee beans according to (a) and one blend component consists of coffee beans according to (b), and wherein the coffee beans according to (a) form 60 to 80% (w/w) of the blend and the coffee beans according to (b) form 20 to 40% (w/w) of the blend.

2. The method of claim 1, wherein the coffee beans provided in steps (a) and (b) have been ground before step (c).

3. The method of claim 1, further comprising the step of spiking green coffee beans of at least one blend component with at least one compound, selected from the group consisting of CGA and trigonelline, prior to roasting.

4. The method of claim 1, wherein the ratio between the concentration of CGA to the concentration of NMP is between 6 and 12 in the coffee drink.

5. The method of claim 1, wherein the coffee drink contains at most 200 mg/L carboxylic acid-5-hydroxytryptamides (C5-HT).

6. The method of claim 3, wherein the green coffee beans of at least one blend component are steam-treated prior to roasting.

7. The method of claim 3, wherein the green coffee beans of at least one blend component are dewaxed and/or decaffeinated prior to roasting.

8. The method of claim 3, wherein the step of spiking green coffee beans is performed by vacuum infiltration.

9. The method of claim 3, wherein the step of spiking green coffee beans is performed by lyophilization.

10. A coffee blend, characterized in that a coffee drink brewed from said coffee blend under standard conditions contains at least 65 mg/L N-methylpyridinium cations (NMP) and at least 550 mg/L chlorogenic acids (CGA) obtainable by a method according to any of claims 1, 2, 3, 4, 5, 6, 7, 8, or 9.

11. The coffee blend of claim 10, which is a blend of coffee beans or a coffee powder blend.

12. The coffee blend of claim 10, wherein the ratio between the concentration of CGA to the concentration of NMP is between 6 and 12 in the coffee drink.

13. The coffee blend of claim 10, wherein the coffee drink contains at most 200 mg/L carboxylic acid-5-hydroxytryptamides (C5-HT).

* * * * *